(12) United States Patent
Ly et al.

(10) Patent No.: US 12,627,361 B2
(45) Date of Patent: May 12, 2026

(54) DECOUPLED UPLINK AND DOWNLINK COMMUNICATIONS VIA RECONFIGURABLE INTELLIGENT SURFACES

(71) Applicant: QUALCOMM INCORPORATED, San Diego, CA (US)

(72) Inventors: Hung Dinh Ly, San Diego, CA (US); Yu Zhang, San Diego, CA (US); Saeid Sahraei, San Diego, CA (US); Krishna Kiran Mukkavilli, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 291 days.

(21) Appl. No.: 18/262,370

(22) PCT Filed: Mar. 10, 2021

(86) PCT No.: PCT/CN2021/079892
§ 371 (c)(1),
(2) Date: Jul. 20, 2023

(87) PCT Pub. No.: WO2022/188052
PCT Pub. Date: Sep. 15, 2022

(65) Prior Publication Data
US 2024/0106515 A1 Mar. 28, 2024

(51) Int. Cl.
H04B 7/06 (2006.01)
H04B 7/04 (2017.01)
(Continued)

(52) U.S. Cl.
CPC ..... H04B 7/06968 (2023.05); H04B 7/04013 (2023.05); H04L 5/0051 (2013.01); H04W 72/231 (2023.01)

(58) Field of Classification Search
CPC ........... H04B 7/06968; H04B 7/04013; H04W 72/231; H04L 5/0051
See application file for complete search history.

(56) References Cited

U.S. PATENT DOCUMENTS

2009/0117901 A1* 5/2009 Zhao ..................... H04W 36/08
455/436
2010/0284446 A1* 11/2010 Mu .................... H04B 7/15521
375/211
(Continued)

FOREIGN PATENT DOCUMENTS

CN 111010219 A 4/2020
CN 111245492 A 6/2020
(Continued)

OTHER PUBLICATIONS

RIS-Assisted Coverage Enhancement in Millimeter Wave Cellular Network, IEEE 10.1109/ACCESS.2020.3031392 (Year: 2020).*
(Continued)

*Primary Examiner* — Faruk Hamza
*Assistant Examiner* — Tito Q Pham
(74) *Attorney, Agent, or Firm* — Holland & Hart LLP

(57) ABSTRACT
Methods, systems, and devices for wireless communications are described. The described techniques support decoupled uplink and downlink communications via reconfigurable intelligent surfaces. Generally, the described techniques provide for using different passive network nodes for uplink and downlink communications. A user equipment (UE) may receive, from a base station, an indication of a first transmission configuration indicator state for downlink communications with the base station and a second transmission configuration indicator state for uplink communications with the base station. The UE may receive, from the base station via a first passive device (e.g., a first reconfigurable intelligent surface (RIS)) associated with the first transmis-
(Continued)

sion configuration indicator state, a downlink message in a radio frame. The UE may transmit, to the base station via a second passive device (e.g., a second RIS) associated with the second transmission configuration indicator state, an uplink message in the radio frame.

30 Claims, 15 Drawing Sheets

(51) Int. Cl.
H04L 5/00 (2006.01)
H04W 72/231 (2023.01)

(56) References Cited

U.S. PATENT DOCUMENTS

2020/0028262 A1* 1/2020 Fang ......................... H01Q 3/46
2020/0170075 A1* 5/2020 Xu ......................... H04B 7/2606
2020/0366363 A1* 11/2020 Li ......................... H04W 24/10
2024/0388354 A1* 11/2024 Fang ................... H04B 7/0874

FOREIGN PATENT DOCUMENTS

CN 112075029 A 12/2020
CN 112272384 A 1/2021
WO WO-2020254031 A1 12/2020

OTHER PUBLICATIONS

International Search Report and Written Opinion—PCT/CN2021/079892—ISA/EPO—Nov. 25, 2021.
Vivo: "Further Discussion on Multi Beam Enhancement", 3GPP TSG RAN WG1 #103-e, R1-2007644, Nov. 13, 2020, 26 Pages, Oct. 26, 2020-Nov. 13, 2020, Section 2, Sections 2.4, 2.5, The Whole Document.

* cited by examiner

300

Receiver

410

Communications Manager

420

Transmitter

415

405

400

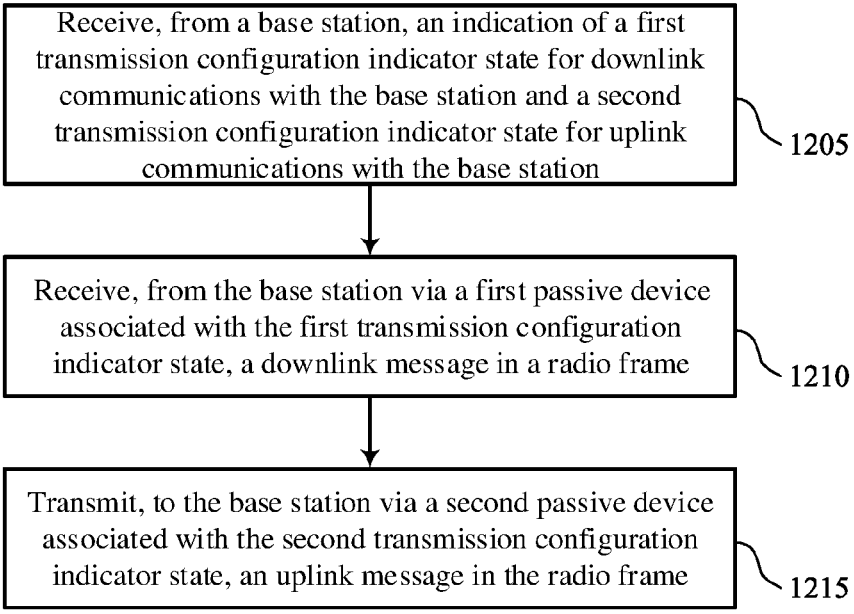

Receive, from a base station, an indication of a first transmission configuration indicator state for downlink communications with the base station and a second transmission configuration indicator state for uplink communications with the base station

1205

Receive, from the base station via a first passive device associated with the first transmission configuration indicator state, a downlink message in a radio frame

1210

Transmit, to the base station via a second passive device associated with the second transmission configuration indicator state, an uplink message in the radio frame

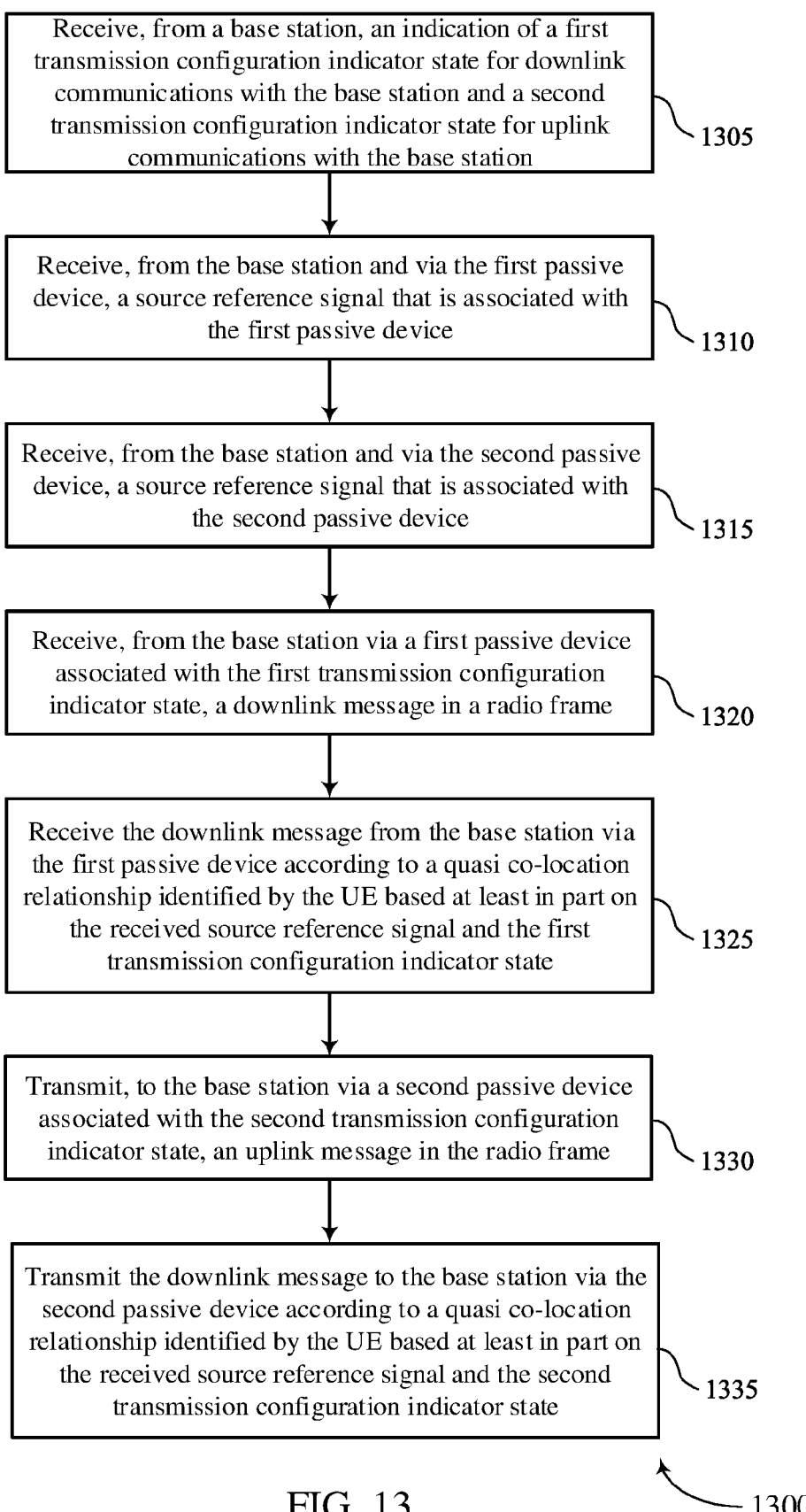

Receive, from a base station, an indication of a first transmission configuration indicator state for downlink communications with the base station and a second transmission configuration indicator state for uplink communications with the base station
1305

Receive, from the base station and via the first passive device, a source reference signal that is associated with the first passive device
1310

Receive, from the base station and via the second passive device, a source reference signal that is associated with the second passive device
1315

Receive, from the base station via a first passive device associated with the first transmission configuration indicator state, a downlink message in a radio frame
1320

Receive the downlink message from the base station via the first passive device according to a quasi co-location relationship identified by the UE based at least in part on the received source reference signal and the first transmission configuration indicator state
1325

Transmit, to the base station via a second passive device associated with the second transmission configuration indicator state, an uplink message in the radio frame
1330

Transmit the downlink message to the base station via the second passive device according to a quasi co-location relationship identified by the UE based at least in part on the received source reference signal and the second transmission configuration indicator state
1335

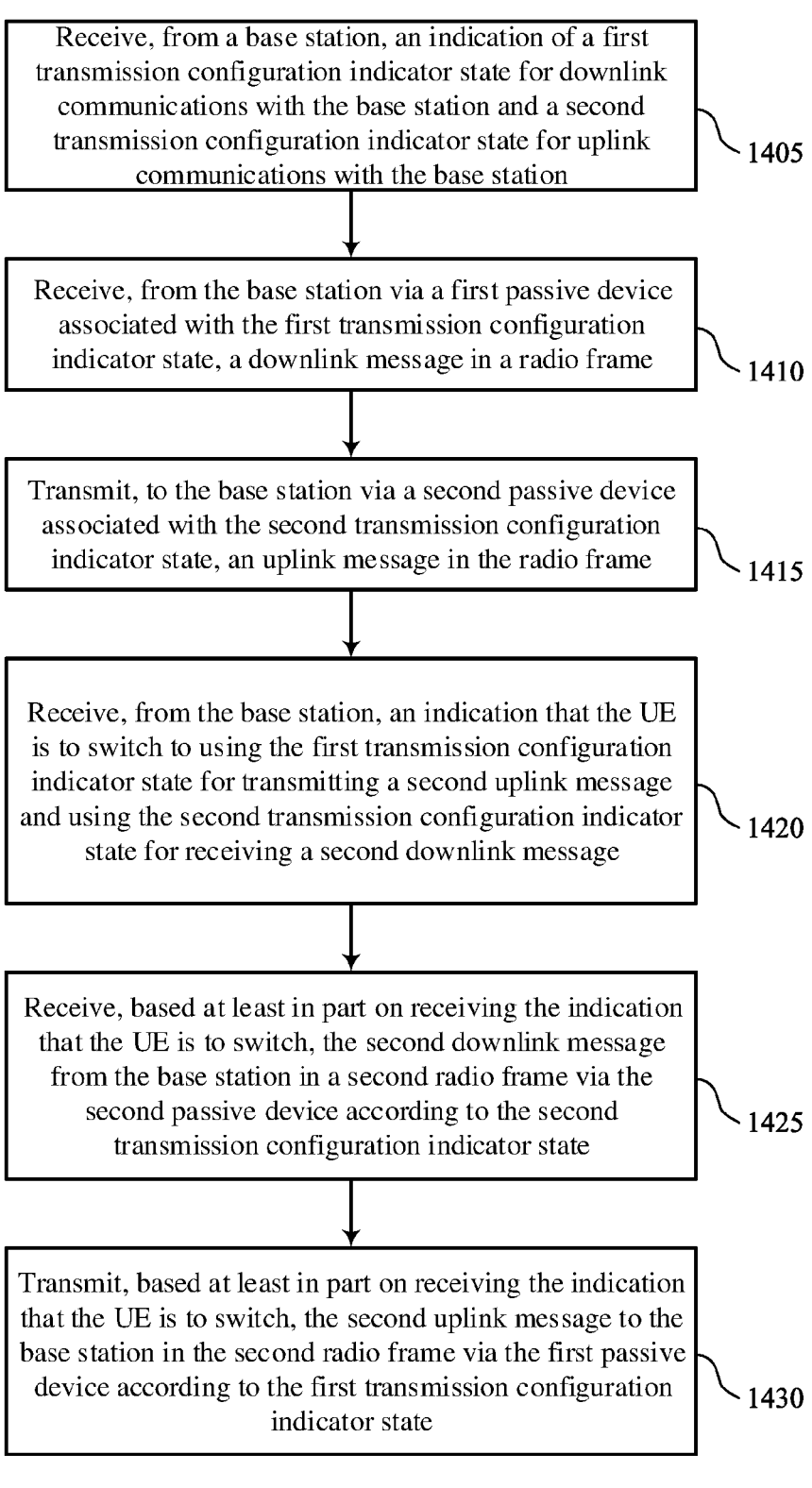

Receive, from a base station, an indication of a first transmission configuration indicator state for downlink communications with the base station and a second transmission configuration indicator state for uplink communications with the base station ⟍ 1405

Receive, from the base station via a first passive device associated with the first transmission configuration indicator state, a downlink message in a radio frame ⟍ 1410

Transmit, to the base station via a second passive device associated with the second transmission configuration indicator state, an uplink message in the radio frame ⟍ 1415

Receive, from the base station, an indication that the UE is to switch to using the first transmission configuration indicator state for transmitting a second uplink message and using the second transmission configuration indicator state for receiving a second downlink message ⟍ 1420

Receive, based at least in part on receiving the indication that the UE is to switch, the second downlink message from the base station in a second radio frame via the second passive device according to the second transmission configuration indicator state ⟍ 1425

Transmit, based at least in part on receiving the indication that the UE is to switch, the second uplink message to the base station in the second radio frame via the first passive device according to the first transmission configuration indicator state ⟍ 1430

FIG. 14    ⟍ 1400

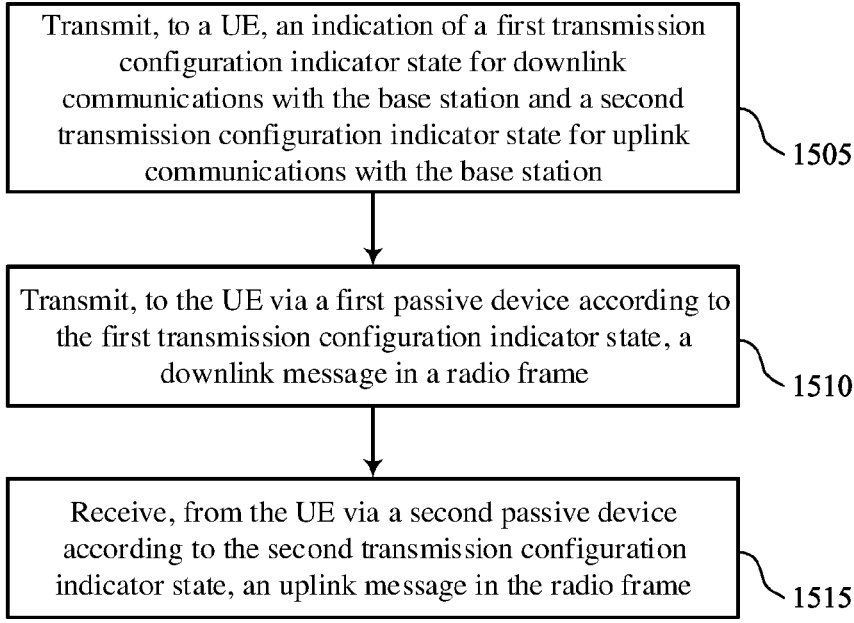

Transmit, to a UE, an indication of a first transmission configuration indicator state for downlink communications with the base station and a second transmission configuration indicator state for uplink communications with the base station

1505

Transmit, to the UE via a first passive device according to the first transmission configuration indicator state, a downlink message in a radio frame

1510

Receive, from the UE via a second passive device according to the second transmission configuration indicator state, an uplink message in the radio frame

DECOUPLED UPLINK AND DOWNLINK COMMUNICATIONS VIA RECONFIGURABLE INTELLIGENT SURFACES

CROSS REFERENCE

The present Application is a 371 national stage filing of International PCT Application No. PCT/CN2021/079892 by L Y et al. entitled "DECOUPLED UPLINK AND DOWNLINK COMMUNICATIONS VIA RECONFIGURABLE INTELLIGENT SURFACES," filed Mar. 10, 2021, which is assigned to the assignee hereof, and which is expressly incorporated by reference in its entirety herein.

FIELD OF TECHNOLOGY

The present disclosure relates to wireless communications, including decoupled uplink and downlink communications via reconfigurable intelligent surfaces.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

A wireless multiple-access communications system may include one or more base stations or one or more network access nodes, each simultaneously supporting communication for multiple communication devices, which may be otherwise known as user equipment (UE). In some wireless communications systems, a UE may transmit uplink data and control information directly to a base station (e.g., using beamforming). In some cases, however, the path between the UE and the base station may be obstructed or blocked, and the likelihood that the base station receives an uplink transmission from the UE may be low.

SUMMARY

The described techniques relate to improved methods, systems, devices, and apparatuses that support decoupled uplink and downlink communications via reconfigurable intelligent surfaces. Generally, the described techniques provide for using different passive devices for uplink and downlink communications. A user equipment (UE) may receive, from a base station, an indication of a first transmission configuration indicator state for downlink communications with the base station and a second transmission configuration indicator state for uplink communications with the base station. The UE may receive, the base station via a first passive device (e.g., a first reconfigurable intelligent surface (RIS)) associated with the first transmission configuration indicator state, a downlink message in a radio frame. The UE may transmit, to the base station via a second passive device (e.g., a second RIS) associated with the second transmission configuration indicator state, an uplink message in the radio frame.

A method for wireless communications at a user equipment (UE) is described. The method may include receiving, from a base station, an indication of a first transmission configuration indicator state for downlink communications with the base station and a second transmission configuration indicator state for uplink communications with the base station, receiving, from the base station via a first passive device associated with the first transmission configuration indicator state, a downlink message in a radio frame, and transmitting, to the base station via a second passive device associated with the second transmission configuration indicator state, an uplink message in the radio frame.

An apparatus for wireless communications at a UE is described. The apparatus may include a processor, memory coupled with the processor, and instructions stored in the memory. The instructions may be executable by the processor to cause the apparatus to receive, from a base station, an indication of a first transmission configuration indicator state for downlink communications with the base station and a second transmission configuration indicator state for uplink communications with the base station, receive, from the base station via a first passive device associated with the first transmission configuration indicator state, a downlink message in a radio frame, and transmit, to the base station via a second passive device associated with the second transmission configuration indicator state, an uplink message in the radio frame.

Another apparatus for wireless communications at a UE is described. The apparatus may include means for receiving, from a base station, an indication of a first transmission configuration indicator state for downlink communications with the base station and a second transmission configuration indicator state for uplink communications with the base station, means for receiving, from the base station via a first passive device associated with the first transmission configuration indicator state, a downlink message in a radio frame, and means for transmitting, to the base station via a second passive device associated with the second transmission configuration indicator state, an uplink message in the radio frame.

A non-transitory computer-readable medium storing code for wireless communications at a UE is described. The code may include instructions executable by a processor to receive, from a base station, an indication of a first transmission configuration indicator state for downlink communications with the base station and a second transmission configuration indicator state for uplink communications with the base station, receive, from the base station via a first passive device associated with the first transmission configuration indicator state, a downlink message in a radio frame, and transmit, to the base station via a second passive device associated with the second transmission configuration indicator state, an uplink message in the radio frame.

Some examples of the method, apparatuses, and non-transitory computer-readable medium described herein may further include operations, features, means, or instructions for receiving, from the base station and via the first passive device, a source reference signal that may be associated with the first passive device and receiving the downlink message from the base station via the first passive device according to a quasi co-location relationship identified by the UE based on the received source reference signal and the first transmission configuration indicator state.

Some examples of the method, apparatuses, and non-transitory computer-readable medium described herein may further include operations, features, means, or instructions for receiving, from the base station and via the second passive device, a source reference signal that may be associated with the second passive device and transmitting the downlink message to the base station via the second passive device according to a quasi co-location relationship identified by the UE based on the received source reference signal and the second transmission configuration indicator state.

Some examples of the method, apparatuses, and non-transitory computer-readable medium described herein may further include operations, features, means, or instructions for receiving, from the base station, an indication that the UE may be to switch to using the first transmission configuration indicator state for transmitting a second uplink message and using the second transmission configuration indicator state for receiving a second downlink message, receiving, based on receiving the indication that the UE may be to switch, the second downlink message from the base station in a second radio frame via the second passive device according to the second transmission configuration indicator state, and transmitting, based on receiving the indication that the UE may be to switch, the second uplink message to the base station in the second radio frame via the first passive device according to the first transmission configuration indicator state.

In some examples of the method, apparatuses, and non-transitory computer-readable medium described herein, receiving the indication that the UE may be to switch may include operations, features, means, or instructions for receiving a downlink control information message or a medium access control layer control element message including the indication that the UE may be to switch.

In some examples of the method, apparatuses, and non-transitory computer-readable medium described herein, receiving the indication that the UE may be to switch may include operations, features, means, or instructions for receiving an indication of a first source reference signal corresponding to the first transmission configuration indicator state and an indication of a second source reference signal corresponding to the second transmission configuration indicator state.

In some examples of the method, apparatuses, and non-transitory computer-readable medium described herein, the first passive device may be a first reconfigurable intelligent surface and the second passive device may be a second reconfigurable intelligent surface.

Some examples of the method, apparatuses, and non-transitory computer-readable medium described herein may further include operations, features, means, or instructions for generating feedback associated with receipt of the downlink message according to the first transmission configuration indicator state and transmitting the feedback in the uplink message according to the second transmission configuration indicator state.

Some examples of the method, apparatuses, and non-transitory computer-readable medium described herein may further include operations, features, means, or instructions for receiving, in the downlink message, feedback associated with transmission of the uplink message according to the second transmission configuration indicator state.

A method for wireless communications at a base station is described. The method may include transmitting, to a UE, an indication of a first transmission configuration indicator state for downlink communications and a second transmission configuration indicator state for uplink communications, transmitting, to the UE via a first passive device according to the first transmission configuration indicator state, a downlink message in a radio frame, and receiving, from the UE via a second passive device according to the second transmission configuration indicator state, an uplink message in the radio frame.

An apparatus for wireless communications at a base station is described. The apparatus may include a processor, memory coupled with the processor, and instructions stored in the memory. The instructions may be executable by the processor to cause the apparatus to transmit, to a UE, an indication of a first transmission configuration indicator state for downlink communications and a second transmission configuration indicator state for uplink communications, transmit, to the UE via a first passive device according to the first transmission configuration indicator state, a downlink message in a radio frame, and receive, from the UE via a second passive device according to the second transmission configuration indicator state, an uplink message in the radio frame.

Another apparatus for wireless communications at a base station is described. The apparatus may include means for transmitting, to a UE, an indication of a first transmission configuration indicator state for downlink communications and a second transmission configuration indicator state for uplink communications, means for transmitting, to the UE via a first passive device according to the first transmission configuration indicator state, a downlink message in a radio frame, and means for receiving, from the UE via a second passive device according to the second transmission configuration indicator state, an uplink message in the radio frame.

A non-transitory computer-readable medium storing code for wireless communications at a base station is described. The code may include instructions executable by a processor to transmit, to a UE, an indication of a first transmission configuration indicator state for downlink communications and a second transmission configuration indicator state for uplink communications, transmit, to the UE via a first passive device according to the first transmission configuration indicator state, a downlink message in a radio frame, and receive, from the UE via a second passive device according to the second transmission configuration indicator state, an uplink message in the radio frame.

Some examples of the method, apparatuses, and non-transitory computer-readable medium described herein may further include operations, features, means, or instructions for transmitting, to the UE via the first passive device, a source reference signal that may be associated with the first passive device and transmitting, to the UE via the first passive device, the downlink message based on a quasi co-location relationship associated with the transmitted source reference signal and defined by the first transmission configuration indicator state.

Some examples of the method, apparatuses, and non-transitory computer-readable medium described herein may further include operations, features, means, or instructions for transmitting, to the UE via the second passive device, a source reference signal that may be associated with the second passive device and receiving, from the UE via the second passive device, the uplink message based on a quasi co-location relationship associated with the transmitted source reference signal and defined by the second transmission configuration indicator state.

Some examples of the method, apparatuses, and non-transitory computer-readable medium described herein may further include operations, features, means, or instructions for transmitting, to the UE, an indication that the UE may be to switch to using the first transmission configuration indicator state for transmitting a second uplink message and the second transmission configuration indicator state for receiving a second downlink message, transmitting, based on transmitting the indication that the UE may be to switch, the second downlink message in a second radio frame via the second passive device according to the second transmission configuration indicator state, and receiving, based on transmitting the indication that the UE may be to switch, the second uplink message in the second radio frame via the first passive device according to the first transmission configuration indicator state.

In some examples of the method, apparatuses, and non-transitory computer-readable medium described herein, transmitting the indication that the UE may be to switch may include operations, features, means, or instructions for transmitting a downlink control information message or a medium access control layer control element message including the indication that the UE may be to switch.

In some examples of the method, apparatuses, and non-transitory computer-readable medium described herein, transmitting the indication that the UE may be to switch may include operations, features, means, or instructions for transmitting an indication of a first source reference signal corresponding to the first transmission configuration indicator state and an indication of a second source reference signal corresponding to the second transmission configuration indicator state.

In some examples of the method, apparatuses, and non-transitory computer-readable medium described herein, the first passive device may be a first reconfigurable intelligent surface and the second passive device may be a second reconfigurable intelligent surface.

In some examples of the method, apparatuses, and non-transitory computer-readable medium described herein, receiving the uplink message may include operations, features, means, or instructions for receiving, from the UE, feedback associated with the transmitted downlink message.

Some examples of the method, apparatuses, and non-transitory computer-readable medium described herein may further include operations, features, means, or instructions for generating feedback associated with receipt of the uplink message that may be transmitted by the UE via the second transmission configuration indicator state and transmitting the feedback in the downlink message via the first transmission configuration indicator state.

BRIEF DESCRIPTION OF THE DRAWINGS

FIGS. 12 through 15 show flowcharts illustrating methods that support decoupled uplink and downlink communications via reconfigurable intelligent surfaces in accordance with aspects of the present disclosure.

DETAILED DESCRIPTION

Figure 1:
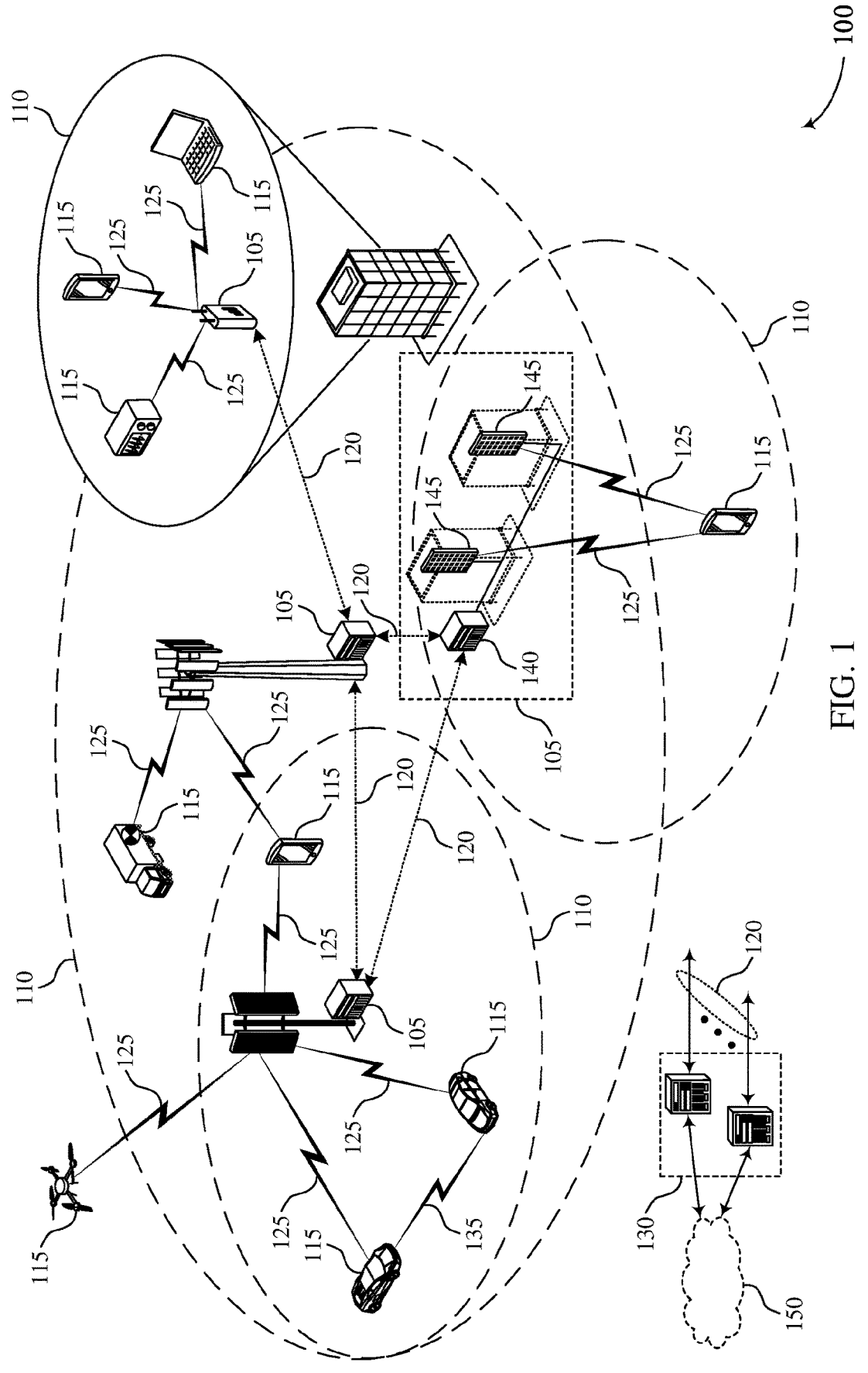
FIG. 1 illustrates an example of a wireless communications system that supports decoupled uplink and downlink communications via reconfigurable intelligent surfaces in accordance with aspects of the present disclosure.

Wireless communications systems may be configured to support multiple input, multiple output (MIMO) communications at various frequency bands. The devices (e.g., user equipments (UEs) and base stations) of the wireless communications system may support beamforming in order to improve signal reliability and efficiency for MIMO communications. In some cases, a beamformed link between a UE and a base station may be impacted by external factors, such as a physical blocking object, signal fading, or other phenomena. In order to support communications in presence of such external factors, the wireless communications system may use additional wireless nodes that may be configured to route communications such that the external factors are limited or avoided. These wireless nodes may be active or passive (near-passive) devices. Example active devices include active antenna unites (AAUs) or wireless repeaters, and such devices may include active antennas and supporting radio frequency circuitry. The active devices may receive a signal from a transmitting device (e.g., a UE or base station) and actively retransmit the signal to a receiving device (e.g., UE or base station). However, given the active nature of such devices, the devices may utilize significant power. Example passive devices include reconfigurable intelligent surfaces (RISs), which may also be referred to as channel engineering devices (CEDs) or configurable deflectors. Given the passive or near passive nature of such devices, the devices may utilize significantly lower power than the active devices.

When RISs are implemented in a wireless communications system in order to extend coverage or improve signal quality or reliability, the gain of the signal between the transmitter and receiver may be dependent on the location of the RISs relative to the devices. For example, for downlink communications, it may be desirable for the MS to be positioned closer to the UE. However, such a location may not be optimal or beneficial for corresponding uplink communications.

Implementations described herein support the utilization of a first MS for downlink communications and a second MS for uplink communications. More particularly, uplink and downlink communications may be decoupled to support the use of different RISs in order to improve signal reliability and efficiency. In order to support separate RISs for uplink and downlink, a base station may configure a UE with two different transmission configuration indicator (TCI) states corresponding to the different RISs. The UE may be configured with the two TCI states using control signaling, such as downlink control information (DCI) signaling, medium access control layer control element (MAC-CE) signaling, or a combination thereof. The UE may use separate source reference signals corresponding to a respective TCI state in order to determine a first beam to use for downlink communications via a first RIS and a second beam to use for uplink communications via a second RIS. In some cases, the UE may be instructed to switch between RISs for uplink and downlink communications. These and other implementations are further described with respect to the figures.

Aspects of the disclosure are initially described in the context of wireless communications systems. Aspects of the disclosure are further described with respect to a wireless communications system implementing separate RISs for uplink and downlink communications and a process flow diagram illustrating various signaling to support the use of separate RISs for uplink and downlink communications. Aspects of the disclosure are further illustrated by and described with reference to apparatus diagrams, system diagrams, and flowcharts that relate to decoupled uplink and downlink communications via reconfigurable intelligent surfaces.

FIG. 1 illustrates an example of a wireless communications system 100 that supports decoupled uplink and downlink communications via reconfigurable intelligent surfaces in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable (e.g., mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (e.g., in a carrier aggregation configuration), a carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by the UEs 115. A carrier may be operated in a standalone mode where initial acquisition and connection may be conducted by the UEs 115 via the carrier, or the carrier may be operated in a non-standalone mode where a connection is anchored using a different carrier (e.g., of the same or a different radio access technology).

The communication links 125 shown in the wireless communications system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications (e.g., in a TDD mode).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of determined bandwidths for carriers of a particular radio access technology (e.g., 1.4, 3, 5, 10, 15, 20, 40, or 80 megahertz (MHz)). Devices of the wireless communications system 100 (e.g., the base stations 105, the UEs 115, or both) may have hardware configurations that support communications over a particular carrier bandwidth or may be configurable to support communications over one of a set of carrier bandwidths. In some examples, the wireless communications system 100 may include base stations 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

One or more numerologies for a carrier may be supported, where a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the base stations 105 or the UEs 115 may be expressed in multiples of a basic time unit which may, for example, refer to a sampling period of T, $=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

Each base station 105 may provide communication coverage via one or more cells, for example a macro cell, a small cell, a hot spot, or other types of cells, or any combination thereof. The term "cell" may refer to a logical communication entity used for communication with a base station 105 (e.g., over a carrier) and may be associated with an identifier for distinguishing neighboring cells (e.g., a physical cell identifier (PCID), a virtual cell identifier (VCID), or others). In some examples, a cell may also refer to a geographic coverage area 110 or a portion of a geographic coverage area 110 (e.g., a sector) over which the logical communication entity operates. Such cells may range from smaller areas (e.g., a structure, a subset of structure) to larger areas depending on various factors such as the capabilities of the base station 105. For example, a cell may be or include a building, a subset of a building, or exterior spaces between or overlapping with geographic coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a lower-powered base station 105, as compared with a macro cell, and a small cell may operate in the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A base station 105 may support one or multiple cells and may also support communications over the one or more cells using one or multiple component carriers.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may support synchronous or asynchronous operation. For synchronous operation, the base stations 105 may have similar frame timings, and transmissions from different base stations 105 may be approximately aligned in time. For asynchronous operation, the base stations 105 may have different frame timings, and transmissions from different base stations 105 may, in some examples, not be aligned in time. The techniques described herein may be used for either synchronous or asynchronous operations.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay such information to a central server or application program that makes use of the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples, half-duplex communications may be performed at a reduced peak rate. Other power conservation techniques for the UEs 115 include entering a power saving deep sleep mode when not engaging in active communications, operating over a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

In some systems, the D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., base stations 105) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may also operate in a super high frequency (SHF) region using frequency bands from 3 GHz to 30 GHz, also known as the centimeter band, or in an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the base stations 105, and EHF antennas of the respective devices may be smaller and more closely spaced than UHF antennas. In some examples, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

The base stations 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A base station 105 or a UE 115 may use beam sweeping techniques as part of beam forming operations. For example, a base station 105 may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a base station 105 multiple times in different directions. For example, the base station 105 may transmit a signal according to different beamforming weight sets associated with different directions of transmission. Transmissions in different beam directions may be used to identify (e.g., by a transmitting device, such as a base station 105, or by a receiving device, such as a UE 115) a beam direction for later transmission or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by the base station 105 in different directions and may report to the base station 105 an indication of the signal that the UE 115 received with a highest signal quality or an otherwise acceptable signal quality.

In some examples, transmissions by a device (e.g., by a base station 105 or a UE 115) may be performed using multiple beam directions, and the device may use a combination of digital precoding or radio frequency beamforming to generate a combined beam for transmission (e.g., from a base station 105 to a UE 115). The UE 115 may report feedback that indicates precoding weights for one or more beam directions, and the feedback may correspond to a configured number of beams across a system bandwidth or one or more sub-bands. The base station 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

A receiving device (e.g., a UE 115) may try multiple receive configurations (e.g., directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned in a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

The UEs 115 and the base stations 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval.

As described herein, the wireless communications system 100 may support massive MIMO communications at various radio frequencies (e.g., mmW) frequencies. Massive MIMO in addition to the use of various frequency bands, such as the mmW bands may support increased throughput. In some cases, a UE 115 may positioned such that a link between the UE 115 and the base station 105 impacted by external elements such as a physical blocker (e.g., an object that impacts or impedes the wireless communications signal). In such cases, various types of devices or network nodes may be used to route the signal between the UE 115 and the base station 105, such as to avoid or limit the signal being impacted by the external elements. For example, a device (e.g., node) may be used to route the signal around the physical blocker. These devices may be active devices or passive devices. Active devices, such as AAUs, which may also be referred to as repeaters, or the like, may include radio frequency chains (e.g., radio frequency circuitry and antennas) for one or more antenna ports. Since these AAUs may include radio frequency circuitry and other active components, the AAUs may consume significant power. In contrast, a passive (e.g., near passive) device may not have active radio frequency circuitry and thus may have negligible power consumption (relative to the AAUs). Example passive devices may be RISs, which may function to redirect an impinging a wave to a desired location. The redirection may be controlled via signals received from a base station 105.

When a RIS is implemented in the wireless communications system 100 to support improved signal reliability, the gain of the signal transmitted between devices (e.g., between a UE 115 and base station 105) may be impacted by the location of the RIS relative to the UE 115. For example, in downlink, it may be desirable for the RIS to be positioned closer to the UE 115. More particularly, a higher spectral efficiency may be achieved when the RIS is closer to the UE 115 for downlink communications. However, the same location may not be optimal (e.g., on a spectral efficiency basis) for uplink communications.

Implementations described herein support the utilization of RISs to balance uplink and downlink communications by decoupling the uplink and downlink communications such that the uplink and downlink communications are routed via different RISs. That is, the UE 115 may receive a downlink message from a base station 105 via a first RIS and send an uplink message to the base station 105 via a second RIS. To support the utilization of different RISs for uplink and downlink, the UE 115 may be configured with separate TCI states. Thus, the base station 105 may configure the UE 115 (e.g., using control messaging such as DCI or MAC-CE) with two different beam configurations (e.g., TCI states). Using these techniques, the base station may leverage the location of the RISs relative to the UE 115 in order to increase the gain and improve signal reliability and throughput, among other benefits. For example, base station may configure the UE with a first TCI state for receiving downlink messages via a first RIS that is closer to the UE and a second TCI state for transmitting uplink messages via a second RIS that is closer to the base station 105 (or in some other position).

Figure 2:
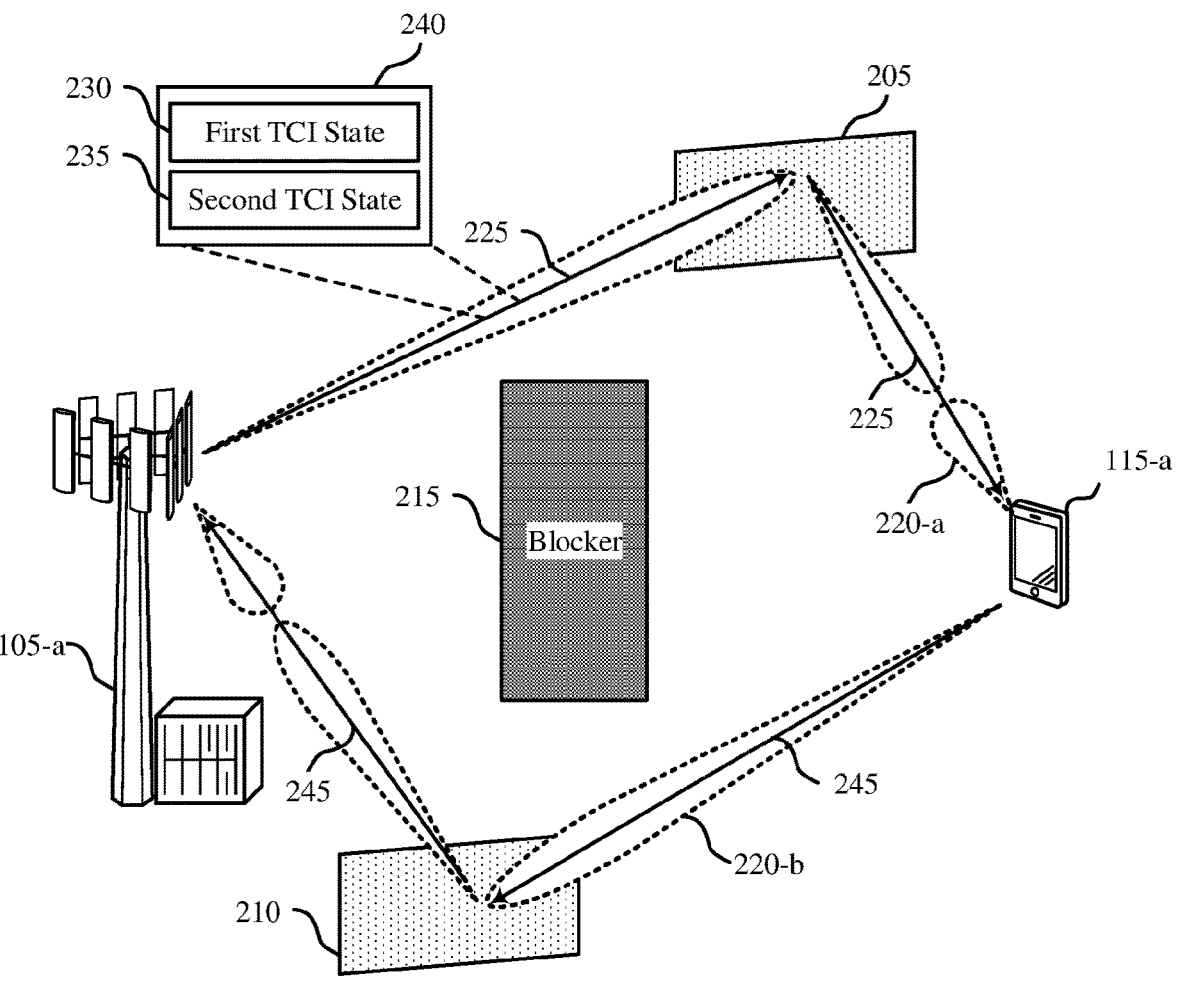
FIG. 2 illustrates an example of a wireless communications system that supports decoupled uplink and downlink communications via reconfigurable intelligent surfaces in accordance with aspects of the present disclosure.

FIG. 2 illustrates an example of a wireless communications system 200 that supports decoupled uplink and downlink communications via reconfigurable intelligent surfaces in accordance with aspects of the present disclosure. The wireless communications system 200 may implement aspects of the wireless communications system 100 in FIG. 1. For example, the wireless communications system includes a base station 105-a, which may be an example of the base station 105 in FIG. 1, and a UE 115-a which may be an example of a UE 115 in FIG. 1.

The wireless communications system 200 illustrates communications between the base station 105-a and the UE 115-a in the presence of a blocker 215. It should be understood that the implementations described herein may be applicable with or without the blocker 215. The blocker 215 may represent a physical obstruction, signal fading, or any other phenomenon or combination of phenomena that may cause communications between the base station 105-a and the UE 115-a to experience signal loss or interference. In this example, the blocker 215 may be a physical obstruction (e.g., buildings, mountains, people, etc.) positioned such that direct communications between the UE 115-a and the base station 105-a may be impacted, such as by experiencing signal loss or interference. Signal loss or interference may be determined by the network, the UE 115-a, the base station 105-a, or any combination thereof. In some cases, in order to correct signal loss or to otherwise improve the efficiency or reliability of the wireless connection between the base station 105-a and the UE 115-a, the base station 105-a may utilize additional wireless nodes to enhance communications with the UE 115-a. For example, the base station 105-a may extend coverage by AAUs (active devices) or utilizing RISs 205 and 210 (e.g., passive multiple input multiple output (MIMO), CEDs, etc.) to enhance communications with the UE 115-a by redirecting (e.g., reflecting, refracting, and/or diffracting) messages. The RISs may be referred to passive (or near-passive) devices, for example because the RISs may not be configured with active antennas or associated radio frequency circuitry to support the antennas. Additionally, the redirection of the RISs may be controlled by the base station 105-a, such that the RISs may be referred to as "near" passive.

In some cases, AAUs (e.g., repeaters) or passive units (e.g., a RIS, such as MS 205) may be used for both uplink and downlink communications with the UE 115-a in order to circumvent the blocker 215 or for other communication enhancement purposes. For example, these nodes may be used to achieve high beamforming gain. An active unit may include individual radio frequency chains per antenna port. However, such active units may be associated with a significant increase in power consumption. More particularly, given the active nature of such units, the units may utilize significant power resources. In contrast, passive units (e.g., the RISs 205 and 210) may be employed in the wireless network to extend coverage with negligible power consumption. The RISs may be configured to redirect (e.g., reflect, refract, and/or diffract) impinging waves to a desired direction, and the redirection may be controlled by base station 105-a. However, given a link imbalance (e.g., transmission power capability) between the base station 105-a and the UE 115-b, the positioning of the MS relative to the UE 115 and the base station 105-a may impact the gain and the spectral efficiency of a communication link. For example, deploying the MS closer to the UE 115-a may achieve a larger gain (relative to positioning the MS closer to the base station 105-a) in downlink communications. However, such a deployment may not be optimal or beneficial for uplink communications.

Implementations described herein support the use of multiple RISs and the decoupling of uplink and downlink communications in order to improve signal strength and increase network reliability. For example, the base station 105-*a* may decouple uplink and downlink communications with the UE 115-*a* by assigning uplink and downlink transmissions to respective RISs 205 and 210. Further, the base station 105-*a* may leverage the locations of the respective RISs to increase gain for uplink and downlink transmissions by assigning each respective RIS to the nearest respective receiving device, as depicted in FIG. 2. For example, the base station 105-*a* may allocate downlink communications to use a first MS 205 near the UE 115-*a* to improve the gain for the downlink communications to the UE 115-*a*. Similarly, the base station 105-*a* may allocate uplink communications to use a second RIS 210 near the base station 105-*a* to improve the gain for the uplink communications transmitted by the UE 115-*a*.

In order to leverage separate RISs for downlink and uplink communications, the base station 105-*a* may transmit, to the UE 115-*a*, an indication of a first beam configuration 230 that the UE 115-*a* is to use for downlink communications and a separate second beam configuration 235 that the UE is to use for uplink communications in the radio frame. For example, the indication of the first beam configuration may correspond to a control message 240 (e.g., a DCI or MAC-CE message) that indicates a first TCI state 230. The UE 115-*a* may identify the first beam configuration (e.g., a first beam 220-*a*) in accordance with the indicated first TCI state 230. In some cases, the base station 105-*a* may transmit a first source reference signal (e.g., synchronization signal block (SSB) or CSI-RS) via the first MS 205 (where the source reference signal is associated with the first RIS 205). The UE 115-*a* may receive a downlink message 225 from the base station 105-*a* via the first MS 205 based on a quasi co-location (QCL) relationship identified between the source reference signal based on the first TCI state 230.

The indication of the second TCI state 235 (e.g., an uplink TCI state) that the UE 115-*a* is to use for uplink communications in the radio frame may be transmitted in the same control message 240 in which the indication of the first beam configuration (e.g., the first TCI state 230) is transmitted or in a separate control message (e.g., a separate DCI or MAC-CE). In some cases, the second or uplink TCI state 235 indication may be in the form of an indication of a spatial domain transmission relation indication (e.g., transmitted via MAC-CE) that indicates a spatial domain transmission filter. The UE 115-*a* may use the second TCI state 235 to identify a second beam configuration (e.g., a second beam 220-*b*) for transmitting one or more uplink messages (e.g., an uplink message 245). For example, the base station 105-*a* may transmit a second source reference signal (e.g., SSB or CSI-RS) via the second RIS 210 (e.g., where the second source reference signal is associated with the second RIS 210). The UE 115-*a* may identify the second beam 220-*b* based on a quasi co-location (QCL) relationship with the received source reference signal according to the indicated second TCI state 235 in order to transmit the uplink communications (e.g., uplink message 245) via the second RIS 210. As such, the downlink message 225 is received from the base station 105-*a* via the first RIS 205 and the first beam 220-*a*, and the uplink message is transmitted to the base station 105-*a* via the second RIS 210 and the second beam 220-*b*.

Thus, using these beam configuration techniques, the downlink and uplink communications between the UE 115-*a* and the base station 105-*a* are decoupled in order to utilize the separate RISs. Decoupling the uplink and downlink communications means that the uplink and downlink communications (with the same base station 105-*a*) use different beam configurations (e.g., beam directions) or TCI states. As described, the different beam configurations may be indicated via respective TCI states. The uplink and downlink communications corresponding to the different beam configurations may be performed (transmitted and received by respective devices) in the same radio frame (e.g., a 10 ms frame that includes ten 1 ms subframes).

In some cases, the UE 115-*a* may generate feedback associated with the receipt of the downlink message 225, from the base station 105-*a*, according to the first beam 220-*a* (e.g., to the UE 115-*a* via RIS 205). The feedback (e.g., HARQ feedback) may indicate whether the UE 115-*a* is able to decode one or more portions of the downlink message 225. The UE 115-*a* may transmit the generated feedback in the uplink message 245 to the base station 105-*a* using the second beam 220-*b* and via the second RIS 210. The base station 105-*a*, may receive the uplink message 245, and therefore, the feedback associated with the downlink message 225. In accordance with the feedback, the base station 105 may repeat transmission of downlink messages 225, via the MS 210. Similarly, the base station 105-*a* may generate feedback associated with the receipt of the uplink message 245 that is transmitted by the UE 115-*a* via the second beam 220-*b*. The base station 105-*a* may transmit the feedback in the downlink message 225 via the RIS 205 to the UE 115-*a*, which the UE 115-*a* may receive using the first beam 220-*a*. The UE 115-*a* may similarly retransmit uplink messages 245 via the RIS 210 according to the feedback received from the base station 105-*a*.

In some examples, the base station 105-*a* may transmit, to the UE 115-*a*, an indication to switch beam configurations for uplink and downlink communications. For example, the UE 115-*a* may receive the indication to switch beam configurations from the base station 105-*a* via a DCI message or a MAC-CE. Specifically, the base station 105-*a* may direct the UE 115-*a* to perform uplink transmissions to via the RIS 205 and receive downlink transmissions from the base station 105-*a* via the RIS 210. In other words, based on the indication to switch, the UE 115-*a* may utilize the second beam 220-*b* for receiving downlink messages and the first beam 220-*a* for transmitting uplink messages. The indication to switch beam configurations may in the form of new TCI states (e.g., TCI states 230 and 235), which may be associated with updated source reference signals that the UE 115 is to use to determine the beams to use for uplink and downlink communications. The UE 115-*a* may use updated QCL relationships with the source reference signals to determine the beams. For example, based on a first QCL relationship with a source reference signal, the UE 115-*a* may receive a second downlink message from the base station 105-*a* via RIS 210 in a second radio frame. Similarly, based on a second QCL relationship, the UE 115-*a* may transmit a second uplink message to the base station 105-*a* via RIS 205 in a second radio frame.

Figure 3:
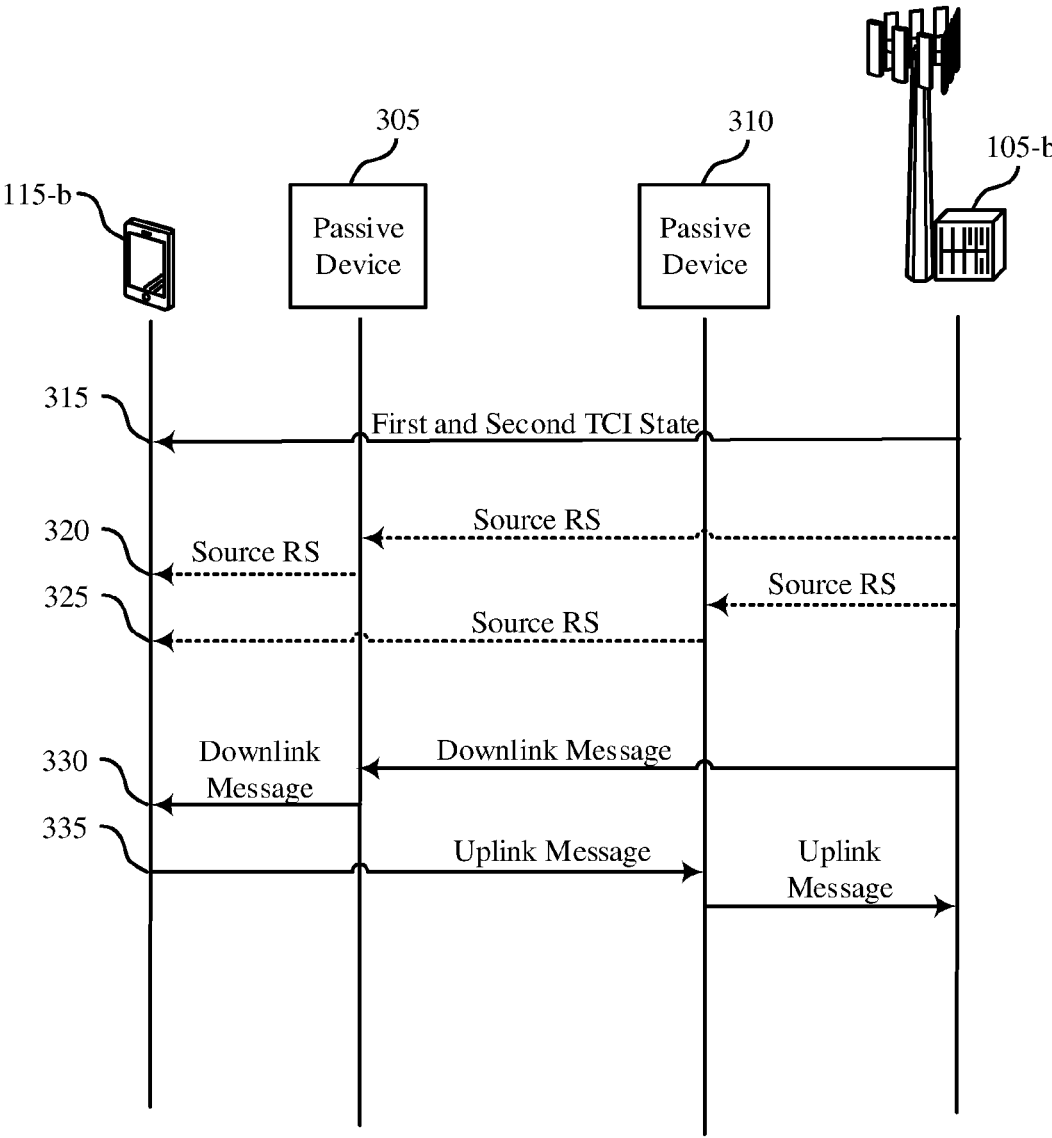
FIG. 3 illustrates an example of a process flow that supports decoupled uplink and downlink communications via reconfigurable intelligent surfaces in accordance with aspects of the present disclosure.

FIG. 3 illustrates an example of a process flow 300 that supports decoupled uplink and downlink communications via reconfigurable intelligent surfaces in accordance with aspects of the present disclosure. The process flow 300 may be implemented by aspects of wireless communications system 100 and 200. For example, the process flow 300 includes a base station 105-*b* and a UE 115-*b*, which may be examples of the corresponding devices described with respect to FIGS. 1 and 2. The process flow 300 also includes a first passive device 305 and a second passive device 310. The passive devices 305 and 310 may be examples of the RISs 205 and 210 as described with respect to FIG. 2.

At 315, the UE 115-*b* may receive, for the same base station 105-*b*, an indication of a first TCI state for downlink communications and a second TCI state for uplink communications. The indications may be received in one or more control messages, such as RRC, MAC-CE, or DCI messages. The second TCI state for the uplink communications may be in the form of an indication of a spatial domain transmission relation corresponding to a filter that the UE is to apply to the uplink communications.

At 320, the UE 115-b may receive a first source reference signal (e.g., SSB or CSI-RS) from the base station 105-b via the first passive device 305. At 325, the UE 115-b may receive a second source reference signal (e.g., SSB or CSI-RS) from the base station 105-b via the second passive device 310. The first source reference signal may be associated with the first passive device such that the UE 115-b may identify a QCL relationship (e.g., based on the first TCI state) between the first source reference signal and the filter (e.g., beam configuration) to use to receive downlink communications via the first passive device. The second source reference signal may be associated with the second passive device such that the UE 115-b may identify a QCL relationship (e.g., based on the second TCI state) between the second source reference signal and the filter (e.g., beam configuration) to use to transmit uplink communications via the second passive device.

At 330, the UE 115-b may receive from the base station 105-b via the first passive device 305 associated with the first TCI state, a downlink message in a radio frame. The downlink message may be received according to a beam configuration identified using the QCL relationship and the first source reference signal. At 335, the UE 115-b may transmit to the base station 105-b via the second passive device 310 associated with the second TCI state, an uplink message in the radio frame. Thus, the downlink and uplink messages may be communicated in the same radio frame between the same devices (e.g., UE 115-b and base station 105-b) but using different TCI states or beam configurations in order to leverage the different RISs.

As described herein, the base station 105-b may use the locations of the RISs in order to improve communication reliability and efficiency. Thus, the base station 105-b may configure the UE 115-b to use a first RIS (e.g., passive device 305) for downlink communications based on the location of the RIS relative to the UE 115-b (e.g., closer to the UE 115-b), and the base station may configure the UE 115-b to use a second RIS (e.g., passive device 310) for uplink communications based on the location of the RIS relative to the UE 115-b or base station 105-b (e.g., closer to the base station 105-b).

In some cases, the base station 105-b may instruct the UE 115-b to switch to using the passive device 310 for downlink communications and the passive device 305 for uplink communications. This instruction may be based on the change in location of the UE 115-b, the passive device 305 or 310, or both the location of the UE 115-b and the passive devices 305 and 310. The instruction may also be based on change in channel conditions due to a change in location of a blocking object or due to some other external factor. The instruction to switch may be indicated via a MAC-CE or DCI message (e.g., including a switching flag or some other switching indicator or field). The instruction to switch may also be indicated via new TCI states (e.g., MAC-CE and/or DCI indications of TCI states) corresponding to uplink communications and downlink communications or via indications of the source reference signals corresponding to the indicated TCI states.

As described herein, the two different TCI states may be used for uplink and downlink communications within the same radio frame. In some cases, the UE 115-b may receive a downlink communication in the radio frame (e.g., via the first passive device 305), and provide feedback (e.g., HARQ feedback corresponding to the downlink communication) in an uplink communication in the same radio frame (e.g., via the second passive device 310). Similarly, the base station 105-b may receive an uplink message in the radio frame via the second passive device 310 and provide feedback to the UE (e.g., HARQ feedback corresponding to the uplink message) in a downlink communication in the same radio frame via the first passive device 305. In some cases, the downlink message transmitted via the first passive device 305 may schedule the uplink message transmitted in via the second passive device 310.

Figure 4:
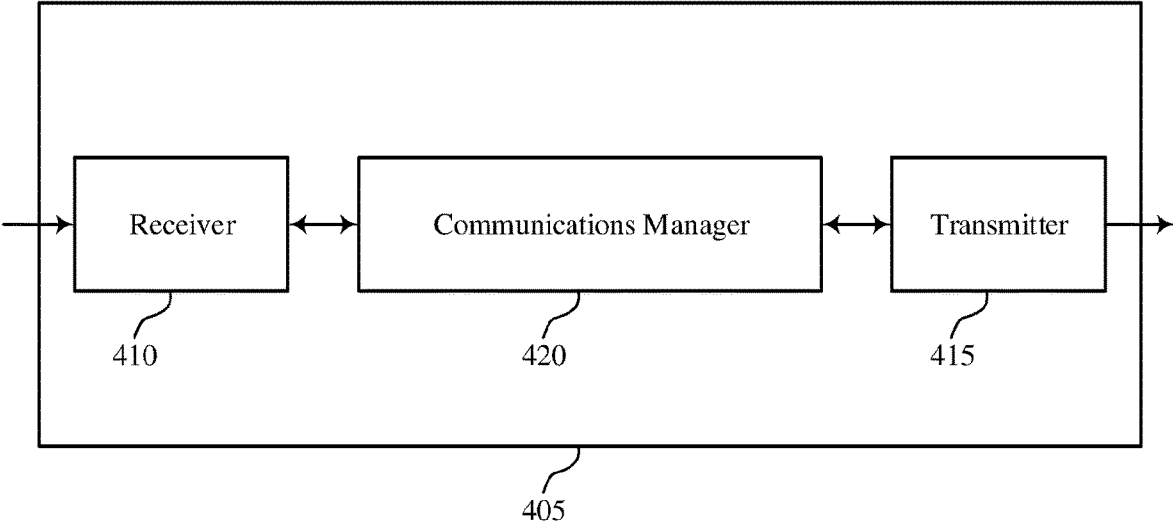
FIGS. 4 and 5 show block diagrams of devices that support decoupled uplink and downlink communications via reconfigurable intelligent surfaces in accordance with aspects of the present disclosure.

FIG. 4 shows a block diagram 400 of a device 405 that supports decoupled uplink and downlink communications via reconfigurable intelligent surfaces in accordance with aspects of the present disclosure. The device 405 may be an example of aspects of a UE 115 as described herein. The device 405 may include a receiver 410, a transmitter 415, and a communications manager 420. The device 405 may also include one or more processors, memory coupled with the one or more processors, and instructions stored in the memory that are executable by the one or more processors to enable the one or more processors to perform the techniques for using multiple RISs for decoupling uplink and downlink communication features discussed herein. Each of these components may be in communication with one another (e.g., via one or more buses).

The receiver 410 may provide a means for receiving information such as packets, user data, control information, or any combination thereof associated with various information channels (e.g., control channels, data channels, information channels related to decoupled uplink and downlink communications via reconfigurable intelligent surfaces). Information may be passed on to other components of the device 405. The receiver 410 may utilize a single antenna or a set of multiple antennas.

The transmitter 415 may provide a means for transmitting signals generated by other components of the device 405. For example, the transmitter 415 may transmit information such as packets, user data, control information, or any combination thereof associated with various information channels (e.g., control channels, data channels, information channels related to decoupled uplink and downlink communications via reconfigurable intelligent surfaces). In some examples, the transmitter 415 may be co-located with a receiver 410 in a transceiver module. The transmitter 415 may utilize a single antenna or a set of multiple antennas.

The communications manager 420, the receiver 410, the transmitter 415, or various combinations thereof or various components thereof may be examples of means for performing various aspects of decoupled uplink and downlink communications via reconfigurable intelligent surfaces as described herein. For example, the communications manager 420, the receiver 410, the transmitter 415, or various combinations or components thereof may support a method for performing one or more of the functions described herein.

In some examples, the communications manager 420, the receiver 410, the transmitter 415, or various combinations or components thereof may be implemented in hardware (e.g., in communications management circuitry). The hardware may include a processor, a digital signal processor (DSP), an application-specific integrated circuit (ASIC), a field-programmable gate array (FPGA) or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 420, the receiver 410, the transmitter 415, or various combinations or components thereof may be implemented in code (e.g., as communications management software or firmware) executed by a processor. If implemented in code executed by a processor, the functions of the communications manager 420, the receiver 410, the transmitter 415, or various combinations or components thereof may be performed by a general-purpose processor, a DSP, a central processing unit (CPU), an ASIC, an FPGA, or any combination of these or other programmable logic devices (e.g., configured as or otherwise supporting a means for performing the functions described in the present disclosure).

In some examples, the communications manager 420 may be configured to perform various operations (e.g., receiving, monitoring, transmitting) using or otherwise in cooperation with the receiver 410, the transmitter 415, or both. For example, the communications manager 420 may receive information from the receiver 410, send information to the transmitter 415, or be integrated in combination with the receiver 410, the transmitter 415, or both to receive information, transmit information, or perform various other operations as described herein.

The communications manager 420 may support wireless communications at a UE in accordance with examples as disclosed herein. For example, the communications manager 420 may be configured as or otherwise support a means for receiving, from a base station, an indication of a first transmission configuration indicator state for downlink communications with the base station and a second transmission configuration indicator state for uplink communications with the base station. The communications manager 420 may be configured as or otherwise support a means for receiving, from the base station via a first passive device associated with the first transmission configuration indicator state, a downlink message in a radio frame. The communications manager 420 may be configured as or otherwise support a means for transmitting, to the base station via a second passive device associated with the second transmission configuration indicator state, an uplink message in the radio frame.

By including or configuring the communications manager 420 in accordance with examples as described herein, the device 405 (e.g., a processor controlling or otherwise coupled to the receiver 410, the transmitter 415, the communications manager 420, or a combination thereof) may support techniques for using different TCI states for uplink and downlink communications. These techniques may support more efficient utilization of communication resources by increasing the gain for uplink and downlink communications via different passive devices, thus resulting in reducing processing overhead (e.g. by reducing dropped or impacted signals).

Figure 5:
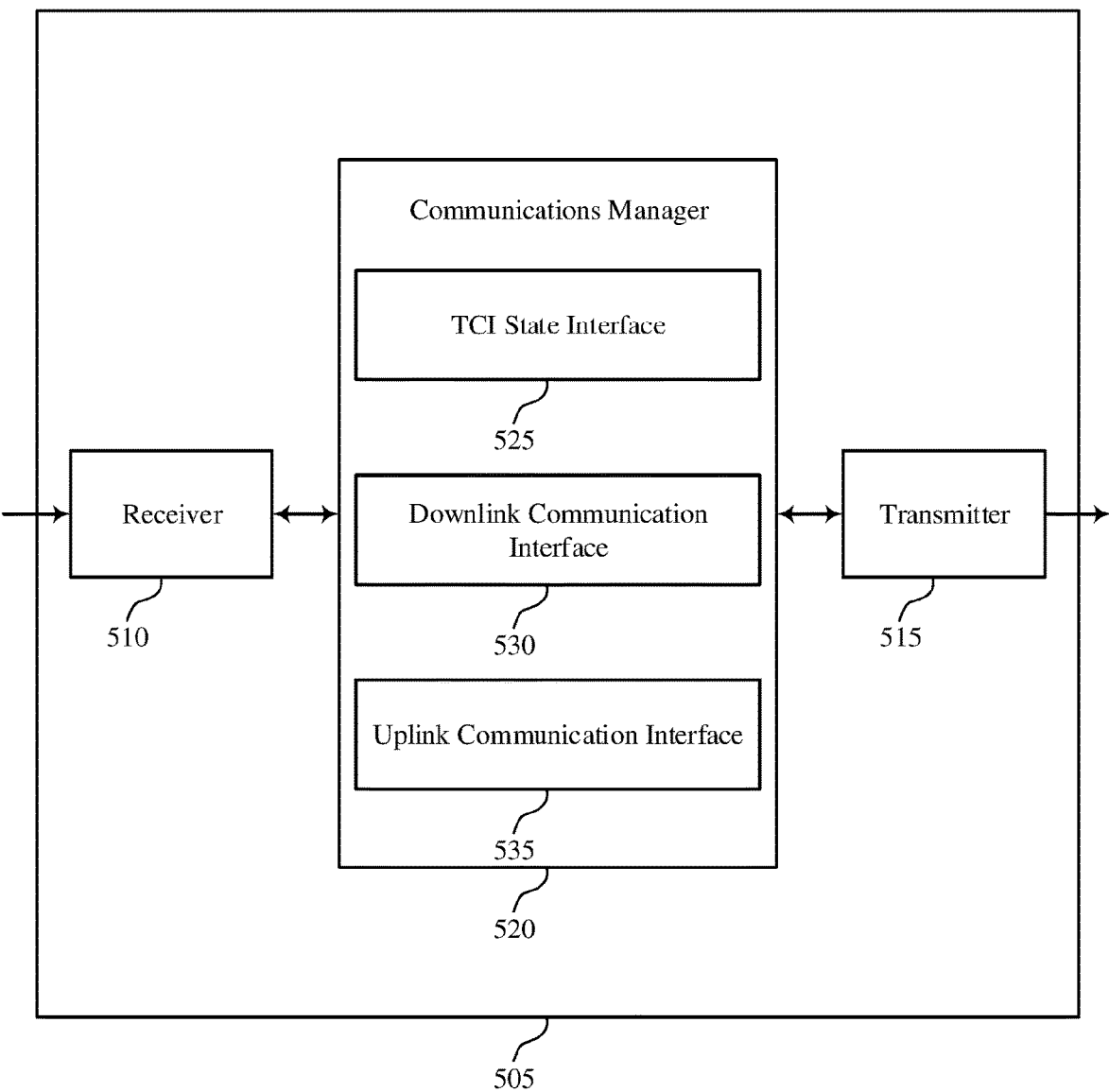

FIG. 5 shows a block diagram 500 of a device 505 that supports decoupled uplink and downlink communications via reconfigurable intelligent surfaces in accordance with aspects of the present disclosure. The device 505 may be an example of aspects of a device 405 or a UE 115 as described herein. The device 505 may include a receiver 510, a transmitter 515, and a communications manager 520. The device 505 may also include a processor. Each of these components may be in communication with one another (e.g., via one or more buses).

The receiver 510 may provide a means for receiving information such as packets, user data, control information, or any combination thereof associated with various information channels (e.g., control channels, data channels, information channels related to decoupled uplink and downlink communications via reconfigurable intelligent surfaces). Information may be passed on to other components of the device 505. The receiver 510 may utilize a single antenna or a set of multiple antennas.

The transmitter 515 may provide a means for transmitting signals generated by other components of the device 505. For example, the transmitter 515 may transmit information such as packets, user data, control information, or any combination thereof associated with various information channels (e.g., control channels, data channels, information channels related to decoupled uplink and downlink communications via reconfigurable intelligent surfaces). In some examples, the transmitter 515 may be co-located with a receiver 510 in a transceiver module. The transmitter 515 may utilize a single antenna or a set of multiple antennas.

The device 505, or various components thereof, may be an example of means for performing various aspects of decoupled uplink and downlink communications via reconfigurable intelligent surfaces as described herein. For example, the communications manager 520 may include a TCI state interface 525, a downlink communication interface 530, an uplink communication interface 535, or any combination thereof. The communications manager 520 may be an example of aspects of a communications manager 420 as described herein. In some examples, the communications manager 520, or various components thereof, may be configured to perform various operations (e.g., receiving, monitoring, transmitting) using or otherwise in cooperation with the receiver 510, the transmitter 515, or both. For example, the communications manager 520 may receive information from the receiver 510, send information to the transmitter 515, or be integrated in combination with the receiver 510, the transmitter 515, or both to receive information, transmit information, or perform various other operations as described herein.

The communications manager 520 may support wireless communications at a UE in accordance with examples as disclosed herein. The TCI state interface 525 may be configured as or otherwise support a means for receiving, from a base station, an indication of a first transmission configuration indicator state for downlink communications with the base station and a second transmission configuration indicator state for uplink communications with the base station. The downlink communication interface 530 may be configured as or otherwise support a means for receiving, from the base station via a first passive device associated with the first transmission configuration indicator state, a downlink message in a radio frame. The uplink communication interface 535 may be configured as or otherwise support a means for transmitting, to the base station via a second passive device associated with the second transmission configuration indicator state, an uplink message in the radio frame.

Figure 6:
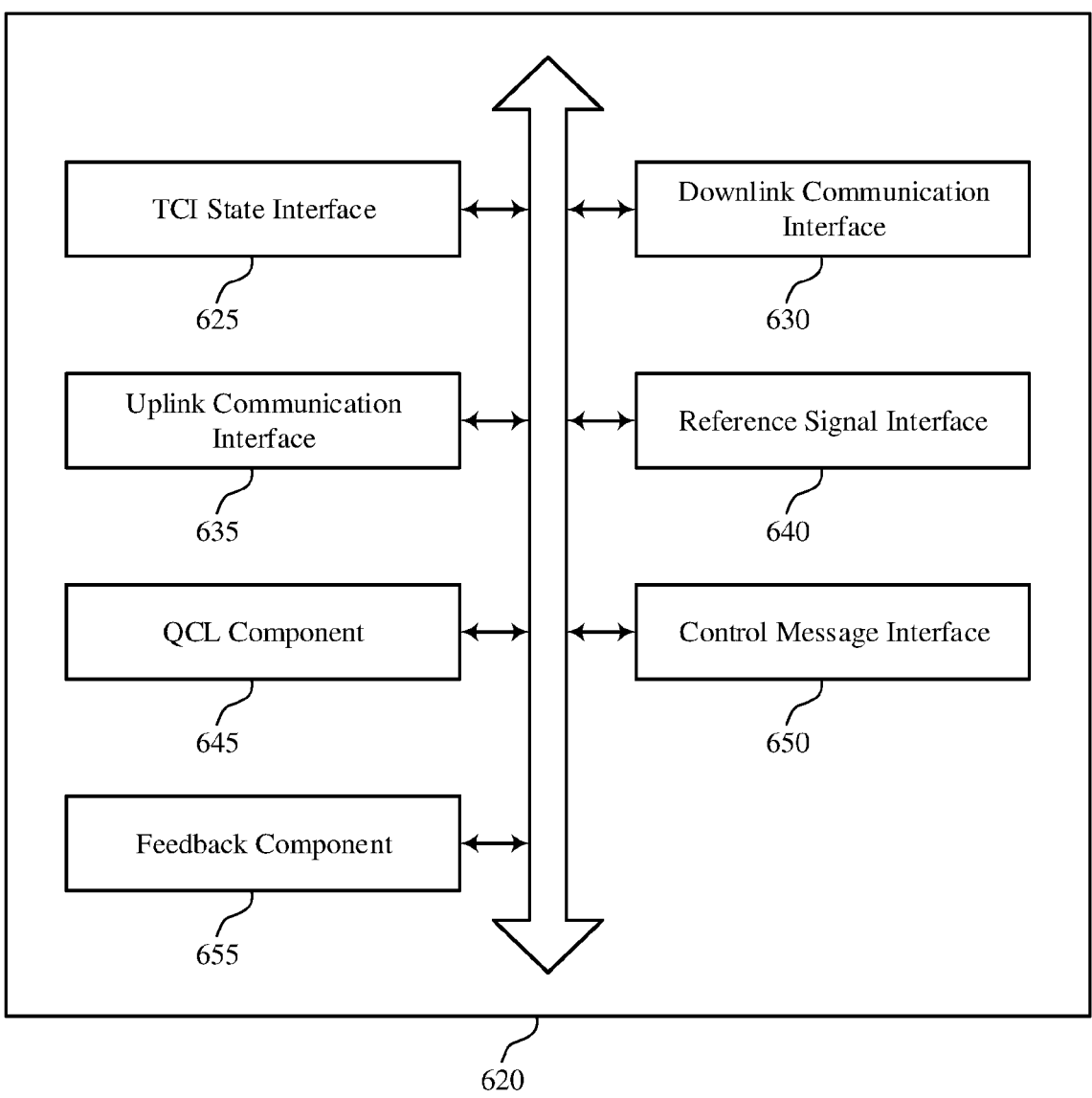
FIG. 6 shows a block diagram of a communications manager that supports decoupled uplink and downlink communications via reconfigurable intelligent surfaces in accordance with aspects of the present disclosure.

In some cases, the TCI state interface 525, the downlink communication interface 530, and the uplink communication interface 535 may each be or be at least a part of a processor (e.g., a transceiver processor, or a radio processor, or a transmitter processor, or a receiver processor). The processor may be coupled with memory and execute instructions stored in the memory that enable the processor to perform or facilitate the features of the TCI state interface 525, the downlink communication interface 530, and the uplink communication interface 535 discussed herein. A transceiver processor may be collocated with and/or communicate with (e.g., direct the operations of) a transceiver of the device. A radio processor may be collocated with and/or communicate with (e.g., direct the operations of) a radio (e.g., an NR radio, an LTE radio, a Wi-Fi radio) of the device. A transmitter processor may be collocated with and/or communicate with (e.g., direct the operations of) a transmitter of the device. A receiver processor may be collocated with and/or communicate with (e.g., direct the operations of) a receiver of the device FIG. 6 shows a block diagram 600 of a communications manager 620 that supports decoupled uplink and downlink communications via reconfigurable intelligent surfaces in accordance with aspects of the present disclosure. The communications manager 620 may be an example of aspects of a communications manager 420, a communications manager 520, or both, as described herein. The communications manager 620, or various components thereof, may be an example of means for performing various aspects of decoupled uplink and downlink communications via reconfigurable intelligent surfaces as described herein. For example, the communications manager 620 may include a TCI state interface 625, a downlink communication interface 630, an uplink communication interface 635, a reference signal interface 640, a QCL component 645, a control message interface 650, a feedback component 655, or any combination thereof. Each of these components may communicate, directly or indirectly, with one another (e.g., via one or more buses).

The communications manager 620 may support wireless communications at a UE in accordance with examples as disclosed herein. The TCI state interface 625 may be configured as or otherwise support a means for receiving, from a base station, an indication of a first transmission configuration indicator state for downlink communications with the base station and a second transmission configuration indicator state for uplink communications with the base station. The downlink communication interface 630 may be configured as or otherwise support a means for receiving, from the base station via a first passive device associated with the first transmission configuration indicator state, a downlink message in a radio frame. The uplink communication interface 635 may be configured as or otherwise support a means for transmitting, to the base station via a second passive device associated with the second transmission configuration indicator state, an uplink message in the radio frame.

In some examples, the reference signal interface 640 may be configured as or otherwise support a means for receiving, from the base station and via the first passive device, a source reference signal that is associated with the first passive device. In some examples, the QCL component 645 may be configured as or otherwise support a means for receiving the downlink message from the base station via the first passive device according to a quasi co-location relationship identified by the UE based on the received source reference signal and the first transmission configuration indicator state.

In some examples, the reference signal interface 640 may be configured as or otherwise support a means for receiving, from the base station and via the second passive device, a source reference signal that is associated with the second passive device. In some examples, the QCL component 645 may be configured as or otherwise support a means for transmitting the downlink message to the base station via the second passive device according to a quasi co-location relationship identified by the UE based on the received source reference signal and the second transmission configuration indicator state.

In some examples, the control message interface 650 may be configured as or otherwise support a means for receiving, from the base station, an indication that the UE is to switch to using the first transmission configuration indicator state for transmitting a second uplink message and using the second transmission configuration indicator state for receiving a second downlink message. In some examples, the downlink communication interface 630 may be configured as or otherwise support a means for receiving, based on receiving the indication that the UE is to switch, the second downlink message from the base station in a second radio frame via the second passive device according to the second transmission configuration indicator state. In some examples, the uplink communication interface 635 may be configured as or otherwise support a means for transmitting, based on receiving the indication that the UE is to switch, the second uplink message to the base station in the second radio frame via the first passive device according to the first transmission configuration indicator state.

In some examples, to support receiving the indication that the UE is to switch, the control message interface 650 may be configured as or otherwise support a means for receiving a downlink control information message or a medium access control layer control element message including the indication that the UE is to switch.

In some examples, to support receiving the indication that the UE is to switch, the control message interface 650 may be configured as or otherwise support a means for receiving an indication of a first source reference signal corresponding to the first transmission configuration indicator state and an indication of a second source reference signal corresponding to the second transmission configuration indicator state.

In some examples, the first passive device is a first reconfigurable intelligent surface and the second passive device is a second reconfigurable intelligent surface.

In some examples, the feedback component 655 may be configured as or otherwise support a means for generating feedback associated with receipt of the downlink message according to the first transmission configuration indicator state. In some examples, the uplink communication interface 635 may be configured as or otherwise support a means for transmitting the feedback in the uplink message according to the second transmission configuration indicator state.

In some examples, the downlink communication interface 630 may be configured as or otherwise support a means for receiving, in the downlink message, feedback associated with transmission of the uplink message according to the second transmission configuration indicator state.

In some cases, the TCI state interface 625, the downlink communication interface 630, the uplink communication interface 635, the reference signal interface 640, the QCL component 645, the control message interface 650, and the feedback component 655 may each be or be at least a part of a processor (e.g., a transceiver processor, or a radio processor, or a transmitter processor, or a receiver processor). The processor may be coupled with memory and execute instructions stored in the memory that enable the processor to perform or facilitate the features of the TCI state interface 625, the downlink communication interface 630, the uplink communication interface 635, the reference signal interface 640, the QCL component 645, the control message interface 650, and the feedback component 655 discussed herein.

Figure 7:
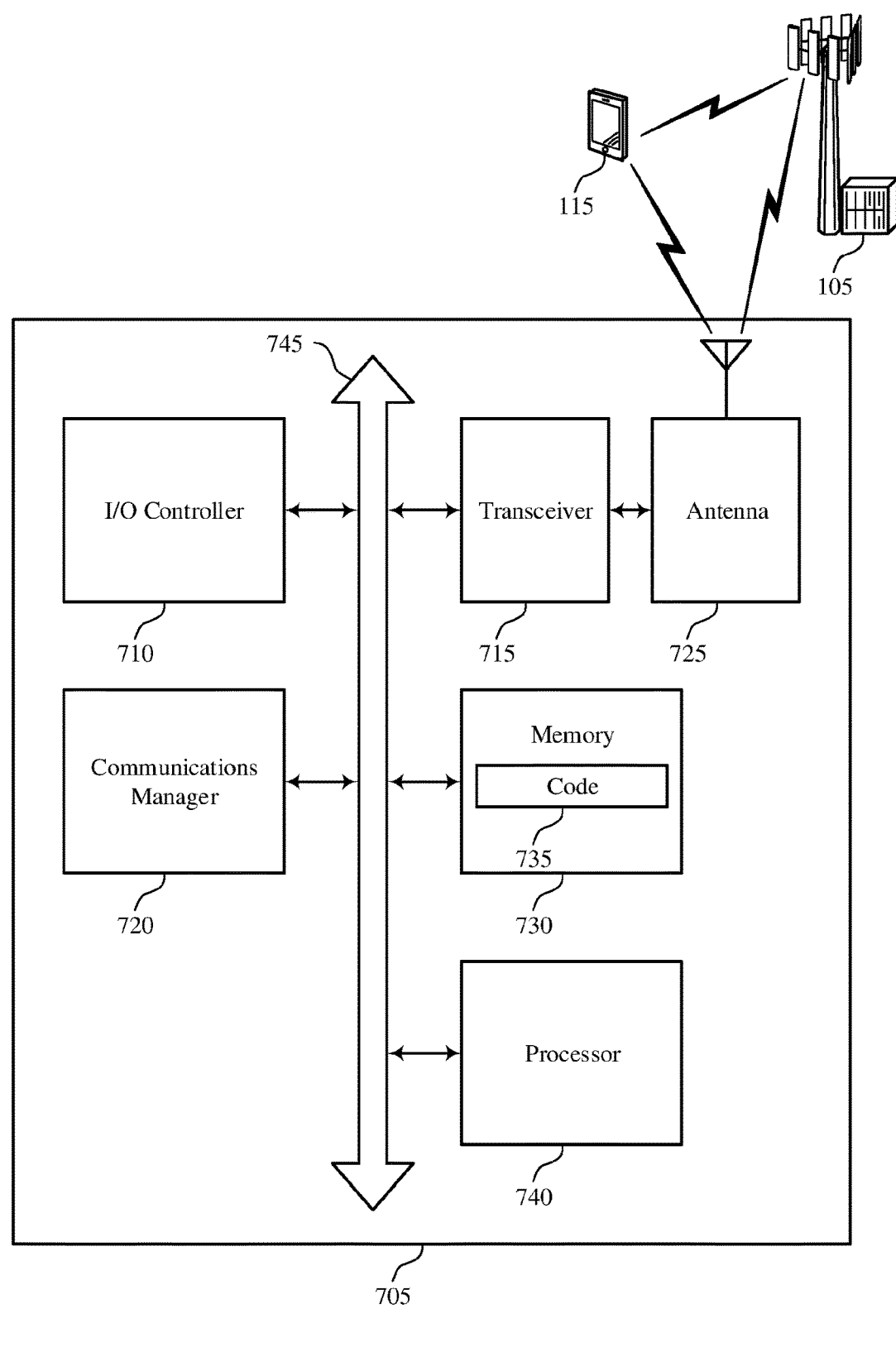
FIG. 7 shows a diagram of a system including a device that supports decoupled uplink and downlink communications via reconfigurable intelligent surfaces in accordance with aspects of the present disclosure.

FIG. 7 shows a diagram of a system 700 including a device 705 that supports decoupled uplink and downlink communications via reconfigurable intelligent surfaces in accordance with aspects of the present disclosure. The device 705 may be an example of or include the components of a device 405, a device 505, or a UE 115 as described herein. The device 705 may communicate wirelessly with one or more base stations 105, UEs 115, or any combination thereof. The device 705 may include components for bi-directional voice and data communications including components for transmitting and receiving communications, such as a communications manager 720, an input/output (I/O) controller 710, a transceiver 715, an antenna 725, a memory 730, code 735, and a processor 740. These components may be in electronic communication or otherwise coupled (e.g., operatively, communicatively, functionally, electronically, electrically) via one or more buses (e.g., a bus 745).

The I/O controller 710 may manage input and output signals for the device 705. The I/O controller 710 may also manage peripherals not integrated into the device 705. In some cases, the I/O controller 710 may represent a physical connection or port to an external peripheral. In some cases, the I/O controller 710 may utilize an operating system such as iOS®, ANDROID®, MS-DOS®, MS-WINDOWS®, OS/2®, UNIX®, LINUX®, or another known operating system. Additionally or alternatively, the I/O controller 710 may represent or interact with a modem, a keyboard, a mouse, a touchscreen, or a similar device. In some cases, the I/O controller 710 may be implemented as part of a processor, such as the processor 740. In some cases, a user may interact with the device 705 via the I/O controller 710 or via hardware components controlled by the I/O controller 710.

In some cases, the device 705 may include a single antenna 725. However, in some other cases, the device 705 may have more than one antenna 725, which may be capable of concurrently transmitting or receiving multiple wireless transmissions. The transceiver 715 may communicate bi-directionally, via the one or more antennas 725, wired, or wireless links as described herein. For example, the transceiver 715 may represent a wireless transceiver and may communicate bi-directionally with another wireless transceiver. The transceiver 715 may also include a modem to modulate the packets, to provide the modulated packets to one or more antennas 725 for transmission, and to demodulate packets received from the one or more antennas 725. The transceiver 715, or the transceiver 715 and one or more antennas 725, may be an example of a transmitter 415, a transmitter 515, a receiver 410, a receiver 510, or any combination thereof or component thereof, as described herein.

The memory 730 may include random access memory (RAM) and read-only memory (ROM). The memory 730 may store computer-readable, computer-executable code 735 including instructions that, when executed by the processor 740, cause the device 705 to perform various functions described herein. The code 735 may be stored in a non-transitory computer-readable medium such as system memory or another type of memory. In some cases, the code 735 may not be directly executable by the processor 740 but may cause a computer (e.g., when compiled and executed) to perform functions described herein. In some cases, the memory 730 may contain, among other things, a basic I/O system (BIOS) which may control basic hardware or software operation such as the interaction with peripheral components or devices.

The processor 740 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 740 may be configured to operate a memory array using a memory controller. In some other cases, a memory controller may be integrated into the processor 740. The processor 740 may be configured to execute computer-readable instructions stored in a memory (e.g., the memory 730) to cause the device 705 to perform various functions (e.g., functions or tasks supporting decoupled uplink and downlink communications via reconfigurable intelligent surfaces). For example, the device 705 or a component of the device 705 may include a processor 740 and memory 730 coupled to the processor 740, the processor 740 and memory 730 configured to perform various functions described herein.

The communications manager 720 may support wireless communications at a UE in accordance with examples as disclosed herein. For example, the communications manager 720 may be configured as or otherwise support a means for receiving, from a base station, an indication of a first transmission configuration indicator state for downlink communications with the base station and a second transmission configuration indicator state for uplink communications with the base station. The communications manager 720 may be configured as or otherwise support a means for receiving, from the base station via a first passive device associated with the first transmission configuration indicator state, a downlink message in a radio frame. The communications manager 720 may be configured as or otherwise support a means for transmitting, to the base station via a second passive device associated with the second transmission configuration indicator state, an uplink message in the radio frame.

By including or configuring the communications manager 720 in accordance with examples as described herein, the device 705 may support techniques for techniques for using different TCI states for uplink and downlink communications. These techniques may support more efficient utilization of communication resources by increasing the gain for uplink and downlink communications via different passive devices, thus resulting in improved communication reliability, improved processing capability, and improved device coordination, among other benefits.

In some examples, the communications manager 720 may be configured to perform various operations (e.g., receiving, monitoring, transmitting) using or otherwise in cooperation with the transceiver 715, the one or more antennas 725, or any combination thereof. Although the communications manager 720 is illustrated as a separate component, in some examples, one or more functions described with reference to the communications manager 720 may be supported by or performed by the processor 740, the memory 730, the code 735, or any combination thereof. For example, the code 735 may include instructions executable by the processor 740 to cause the device 705 to perform various aspects of decoupled uplink and downlink communications via reconfigurable intelligent surfaces as described herein, or the processor 740 and the memory 730 may be otherwise configured to perform or support such operations.

Figure 8:
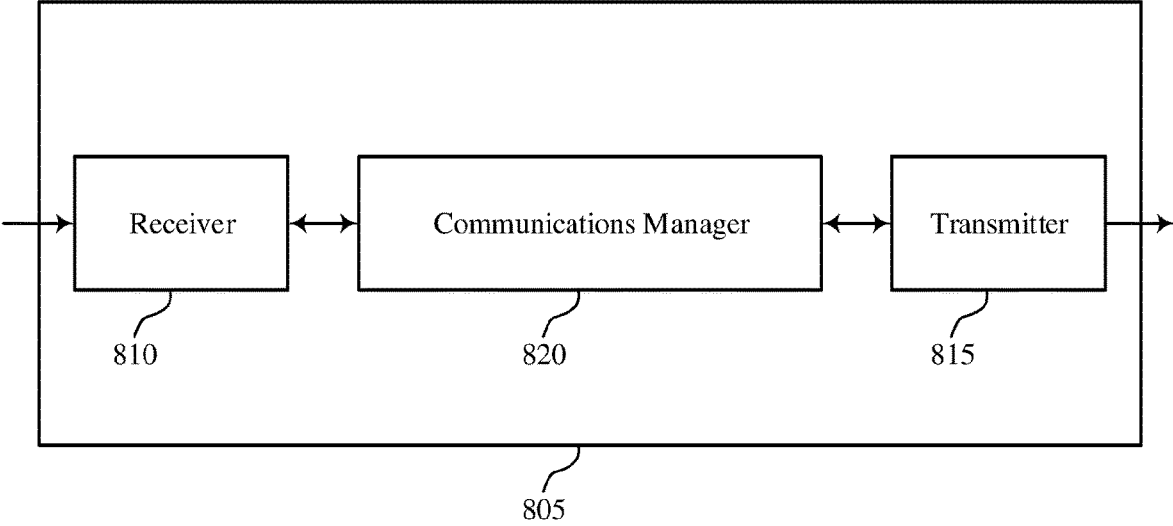
FIGS. 8 and 9 show block diagrams of devices that support decoupled uplink and downlink communications via reconfigurable intelligent surfaces in accordance with aspects of the present disclosure.

FIG. 8 shows a block diagram 800 of a device 805 that supports decoupled uplink and downlink communications via reconfigurable intelligent surfaces in accordance with aspects of the present disclosure. The device 805 may be an example of aspects of a base station 105 as described herein. The device 805 may include a receiver 810, a transmitter 815, and a communications manager 820. The device 805 may also include one or more processors, memory coupled with the one or more processors, and instructions stored in the memory that are executable by the one or more processors to enable the one or more processors to perform the techniques for using multiple RISs for decoupling uplink and downlink communication features discussed herein. Each of these components may be in communication with one another (e.g., via one or more buses).

The receiver 810 may provide a means for receiving information such as packets, user data, control information, or any combination thereof associated with various information channels (e.g., control channels, data channels, information channels related to decoupled uplink and downlink communications via reconfigurable intelligent surfaces). Information may be passed on to other components of the device 805. The receiver 810 may utilize a single antenna or a set of multiple antennas.

The transmitter 815 may provide a means for transmitting signals generated by other components of the device 805. For example, the transmitter 815 may transmit information such as packets, user data, control information, or any combination thereof associated with various information channels (e.g., control channels, data channels, information channels related to decoupled uplink and downlink communications via reconfigurable intelligent surfaces). In some examples, the transmitter 815 may be co-located with a receiver 810 in a transceiver module. The transmitter 815 may utilize a single antenna or a set of multiple antennas.

The communications manager 820, the receiver 810, the transmitter 815, or various combinations thereof or various components thereof may be examples of means for performing various aspects of decoupled uplink and downlink communications via reconfigurable intelligent surfaces as described herein. For example, the communications manager 820, the receiver 810, the transmitter 815, or various combinations or components thereof may support a method for performing one or more of the functions described herein.

In some examples, the communications manager 820, the receiver 810, the transmitter 815, or various combinations or components thereof may be implemented in hardware (e.g., in communications management circuitry). The hardware may include a processor, a DSP, an ASIC, an FPGA or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 820, the receiver 810, the transmitter 815, or various combinations or components thereof may be implemented in code (e.g., as communications management software or firmware) executed by a processor. If implemented in code executed by a processor, the functions of the communications manager 820, the receiver 810, the transmitter 815, or various combinations or components thereof may be performed by a general-purpose processor, a DSP, a CPU, an ASIC, an FPGA, or any combination of these or other programmable logic devices (e.g., configured as or otherwise supporting a means for performing the functions described in the present disclosure).

In some examples, the communications manager 820 may be configured to perform various operations (e.g., receiving, monitoring, transmitting) using or otherwise in cooperation with the receiver 810, the transmitter 815, or both. For example, the communications manager 820 may receive information from the receiver 810, send information to the transmitter 815, or be integrated in combination with the receiver 810, the transmitter 815, or both to receive information, transmit information, or perform various other operations as described herein.

The communications manager 820 may support wireless communications at a base station in accordance with examples as disclosed herein. For example, the communications manager 820 may be configured as or otherwise support a means for transmitting, to a UE, an indication of a first transmission configuration indicator state for downlink communications and a second transmission configuration indicator state for uplink communications. The communications manager 820 may be configured as or otherwise support a means for transmitting, to the UE via a first passive device according to the first transmission configuration indicator state, a downlink message in a radio frame. The communications manager 820 may be configured as or otherwise support a means for receiving, from the UE via a second passive device according to the second transmission configuration indicator state, an uplink message in the radio frame.

By including or configuring the communications manager 820 in accordance with examples as described herein, the device 805 (e.g., a processor controlling or otherwise coupled to the receiver 810, the transmitter 815, the communications manager 820, or a combination thereof) may support techniques for using different TCI states for uplink and downlink communications. These techniques may support more efficient utilization of communication resources by increasing the gain for uplink and downlink communications via different passive devices, thus resulting in reducing processing overhead (e.g. by reducing dropped or impacted signals).

Figure 9:
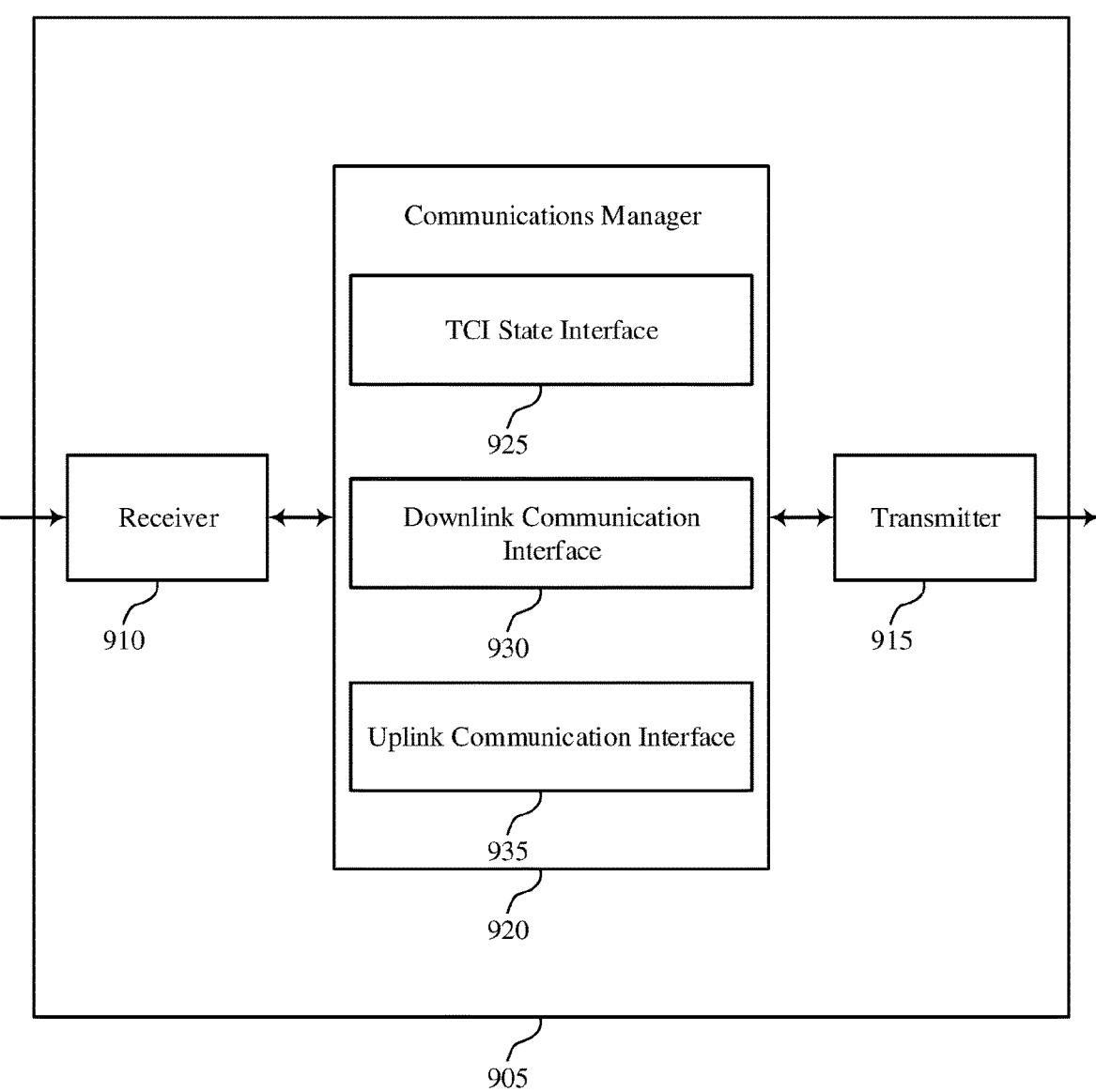

FIG. 9 shows a block diagram 900 of a device 905 that supports decoupled uplink and downlink communications via reconfigurable intelligent surfaces in accordance with aspects of the present disclosure. The device 905 may be an example of aspects of a device 805 or a base station 105 as described herein. The device 905 may include a receiver 910, a transmitter 915, and a communications manager 920. The device 905 may also include a processor. Each of these components may be in communication with one another (e.g., via one or more buses).

The receiver 910 may provide a means for receiving information such as packets, user data, control information, or any combination thereof associated with various information channels (e.g., control channels, data channels, information channels related to decoupled uplink and downlink communications via reconfigurable intelligent surfaces). Information may be passed on to other components of the device 905. The receiver 910 may utilize a single antenna or a set of multiple antennas.

The transmitter 915 may provide a means for transmitting signals generated by other components of the device 905. For example, the transmitter 915 may transmit information such as packets, user data, control information, or any combination thereof associated with various information channels (e.g., control channels, data channels, information channels related to decoupled uplink and downlink communications via reconfigurable intelligent surfaces). In some examples, the transmitter 915 may be co-located with a receiver 910 in a transceiver module. The transmitter 915 may utilize a single antenna or a set of multiple antennas.

The device 905, or various components thereof, may be an example of means for performing various aspects of decoupled uplink and downlink communications via reconfigurable intelligent surfaces as described herein. For example, the communications manager 920 may include a TCI state interface 925, a downlink communication interface 930, an uplink communication interface 935, or any combination thereof. The communications manager 920 may be an example of aspects of a communications manager 820 as described herein. In some examples, the communications manager 920, or various components thereof, may be configured to perform various operations (e.g., receiving, monitoring, transmitting) using or otherwise in cooperation with the receiver 910, the transmitter 915, or both. For example, the communications manager 920 may receive information from the receiver 910, send information to the transmitter 915, or be integrated in combination with the receiver 910, the transmitter 915, or both to receive information, transmit information, or perform various other operations as described herein.

The communications manager 920 may support wireless communications at a base station in accordance with examples as disclosed herein. The TCI state interface 925 may be configured as or otherwise support a means for transmitting, to a UE, an indication of a first transmission configuration indicator state for downlink communications and a second transmission configuration indicator state for uplink communications. The downlink communication interface 930 may be configured as or otherwise support a means for transmitting, to the UE via a first passive device according to the first transmission configuration indicator state, a downlink message in a radio frame. The uplink communication interface 935 may be configured as or otherwise support a means for receiving, from the UE via a second passive device according to the second transmission configuration indicator state, an uplink message in the radio frame.

In some cases, the TCI state interface 925, the downlink communication interface 930, and the uplink communication interface 935 may each be or be at least a part of a processor (e.g., a transceiver processor, or a radio processor, or a transmitter processor, or a receiver processor). The processor may be coupled with memory and execute instructions stored in the memory that enable the processor to perform or facilitate the features of the TCI state interface 925, the downlink communication interface 930, and the uplink communication interface 935 discussed herein. A transceiver processor may be collocated with and/or communicate with (e.g., direct the operations of) a transceiver of the device. A radio processor may be collocated with and/or communicate with (e.g., direct the operations of) a radio (e.g., an NR radio, an LTE radio, a Wi-Fi radio) of the device. A transmitter processor may be collocated with and/or communicate with (e.g., direct the operations of) a transmitter of the device. A receiver processor may be collocated with and/or communicate with (e.g., direct the operations of) a receiver of the device.

Figure 10:
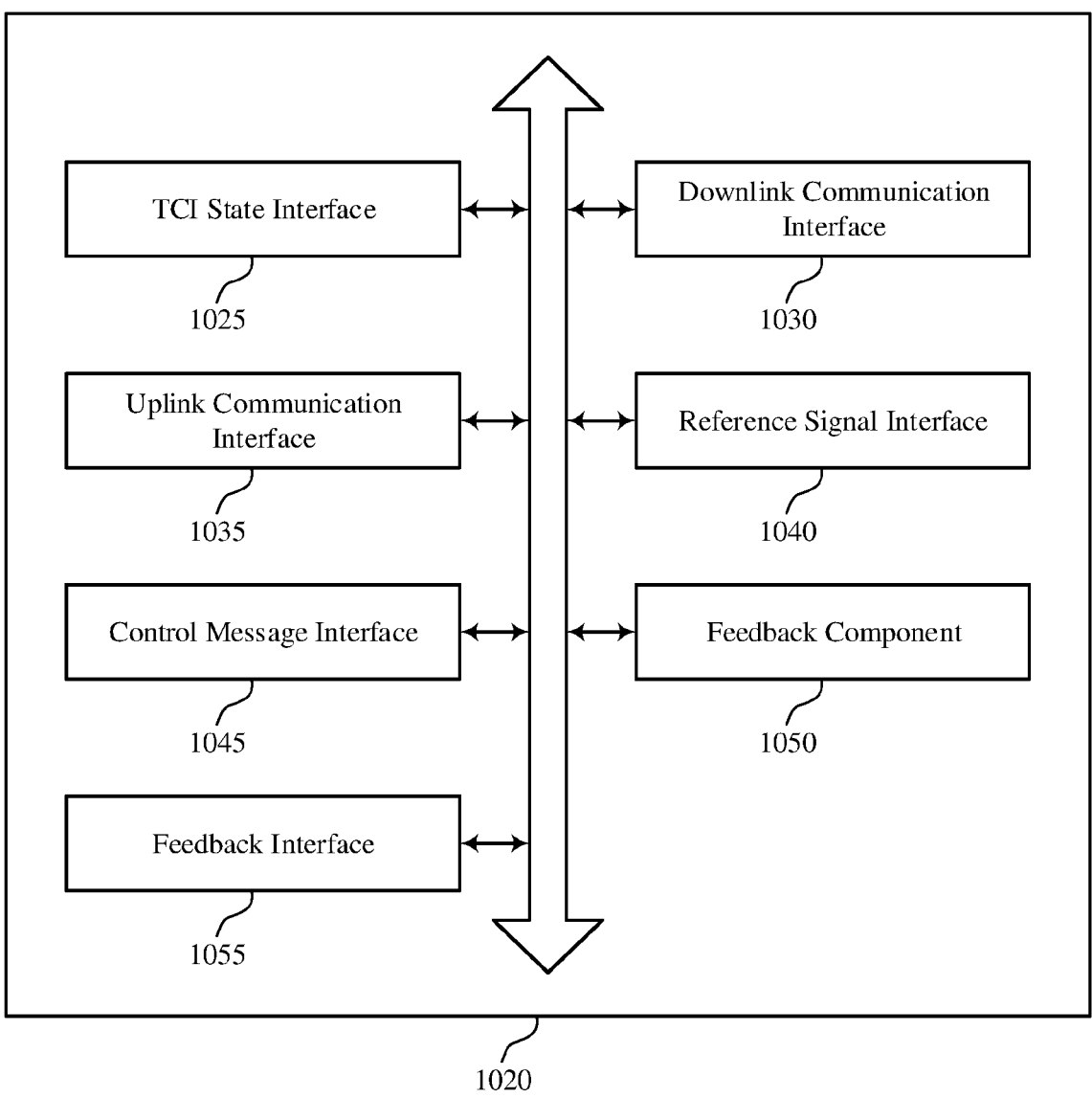
FIG. 10 shows a block diagram of a communications manager that supports decoupled uplink and downlink communications via reconfigurable intelligent surfaces in accordance with aspects of the present disclosure.

FIG. 10 shows a block diagram 1000 of a communications manager 1020 that supports decoupled uplink and downlink communications via reconfigurable intelligent surfaces in accordance with aspects of the present disclosure. The communications manager 1020 may be an example of aspects of a communications manager 820, a communications manager 920, or both, as described herein. The communications manager 1020, or various components thereof, may be an example of means for performing various aspects of decoupled uplink and downlink communications via reconfigurable intelligent surfaces as described herein. For example, the communications manager 1020 may include a TCI state interface 1025, a downlink communication interface 1030, an uplink communication interface 1035, a reference signal interface 1040, a control message interface 1045, a feedback component 1050, a feedback interface 1055, or any combination thereof. Each of these components may communicate, directly or indirectly, with one another (e.g., via one or more buses).

The communications manager 1020 may support wireless communications at a base station in accordance with examples as disclosed herein. The TCI state interface 1025 may be configured as or otherwise support a means for transmitting, to a UE, an indication of a first transmission configuration indicator state for downlink communications and a second transmission configuration indicator state for uplink communications. The downlink communication interface 1030 may be configured as or otherwise support a means for transmitting, to the UE via a first passive device according to the first transmission configuration indicator state, a downlink message in a radio frame. The uplink communication interface 1035 may be configured as or otherwise support a means for receiving, from the UE via a second passive device according to the second transmission configuration indicator state, an uplink message in the radio frame.

In some examples, the reference signal interface 1040 may be configured as or otherwise support a means for transmitting, to the UE via the first passive device, a source reference signal that is associated with the first passive device. In some examples, the downlink communication interface 1030 may be configured as or otherwise support a means for transmitting, to the UE via the first passive device, the downlink message based on a quasi co-location relationship associated with the transmitted source reference signal and defined by the first transmission configuration indicator state.

In some examples, the reference signal interface 1040 may be configured as or otherwise support a means for transmitting, to the UE via the second passive device, a source reference signal that is associated with the second passive device. In some examples, the uplink communication interface 1035 may be configured as or otherwise support a means for receiving, from the UE via the second passive device, the uplink message based on a quasi co-location relationship associated with the transmitted source reference signal and defined by the second transmission configuration indicator state.

In some examples, the control message interface 1045 may be configured as or otherwise support a means for transmitting, to the UE, an indication that the UE is to switch to using the first transmission configuration indicator state for transmitting a second uplink message and the second transmission configuration indicator state for receiving a second downlink message. In some examples, the downlink communication interface 1030 may be configured as or otherwise support a means for transmitting, based on transmitting the indication that the UE is to switch, the second downlink message in a second radio frame via the second passive device according to the second transmission configuration indicator state. In some examples, the uplink communication interface 1035 may be configured as or otherwise support a means for receiving, based on transmitting the indication that the UE is to switch, the second uplink message in the second radio frame via the first passive device according to the first transmission configuration indicator state.

In some examples, to support transmitting the indication that the UE is to switch, the control message interface 1045 may be configured as or otherwise support a means for transmitting a downlink control information message or a medium access control layer control element message including the indication that the UE is to switch.

In some examples, to support transmitting the indication that the UE is to switch, the control message interface 1045 may be configured as or otherwise support a means for transmitting an indication of a first source reference signal corresponding to the first transmission configuration indicator state and an indication of a second source reference signal corresponding to the second transmission configuration indicator state.

In some examples, the first passive device is a first reconfigurable intelligent surface and the second passive device is a second reconfigurable intelligent surface.

In some examples, to support receiving the uplink message, the feedback component 1050 may be configured as or otherwise support a means for receiving, from the UE, feedback associated with the transmitted downlink message.

In some examples, the feedback component 1050 may be configured as or otherwise support a means for generating feedback associated with receipt of the uplink message that is transmitted by the UE via the second transmission configuration indicator state. In some examples, the feedback interface 1055 may be configured as or otherwise support a means for transmitting the feedback in the downlink message via the first transmission configuration indicator state.

In some cases, the TCI state interface 1025, the downlink communication interface 1030, the uplink communication interface 1035, the reference signal interface 1040, a control message interface 1045, the feedback component 1050, and the feedback interface 1055 may each be or be at least a part of a processor (e.g., a transceiver processor, or a radio processor, or a transmitter processor, or a receiver processor). The processor may be coupled with memory and execute instructions stored in the memory that enable the processor to perform or facilitate the features of the TCI state interface 1025, the downlink communication interface 1030, the uplink communication interface 1035, the reference signal interface 1040, a control message interface 1045, the feedback component 1050, and the feedback interface 1055 discussed herein.

Figure 11:
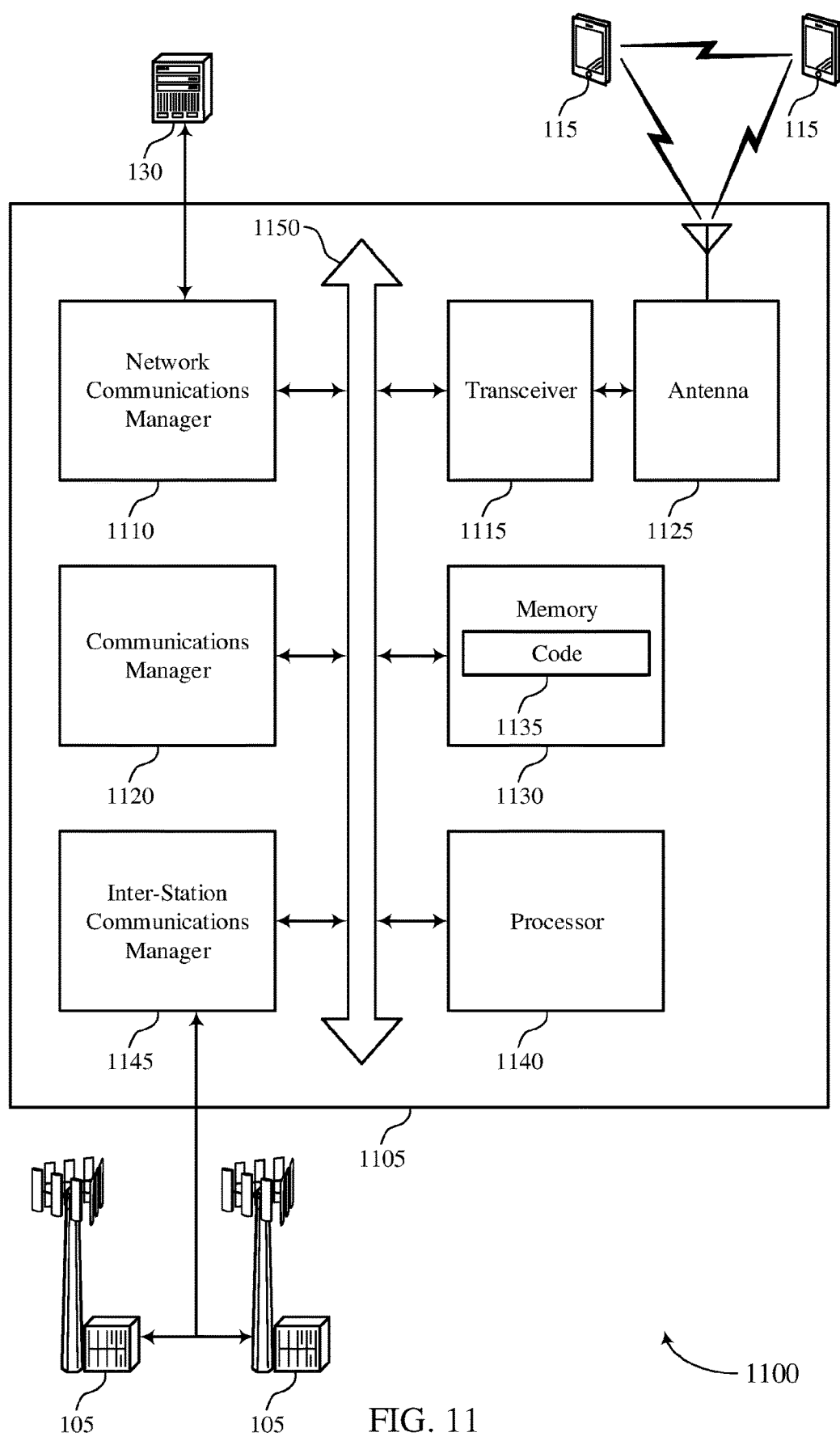
FIG. 11 shows a diagram of a system including a device that supports decoupled uplink and downlink communications via reconfigurable intelligent surfaces in accordance with aspects of the present disclosure.

FIG. 11 shows a diagram of a system 1100 including a device 1105 that supports decoupled uplink and downlink communications via reconfigurable intelligent surfaces in accordance with aspects of the present disclosure. The device 1105 may be an example of or include the components of a device 805, a device 905, or a base station 105 as described herein. The device 1105 may communicate wirelessly with one or more base stations 105, UEs 115, or any combination thereof. The device 1105 may include components for bi-directional voice and data communications including components for transmitting and receiving communications, such as a communications manager 1120, a network communications manager 1110, a transceiver 1115, an antenna 1125, a memory 1130, code 1135, a processor 1140, and an inter-station communications manager 1145. These components may be in electronic communication or otherwise coupled (e.g., operatively, communicatively, functionally, electronically, electrically) via one or more buses (e.g., a bus 1150).

The network communications manager 1110 may manage communications with a core network 130 (e.g., via one or more wired backhaul links). For example, the network communications manager 1110 may manage the transfer of data communications for client devices, such as one or more UEs 115.

In some cases, the device 1105 may include a single antenna 1125. However, in some other cases the device 1105 may have more than one antenna 1125, which may be capable of concurrently transmitting or receiving multiple wireless transmissions. The transceiver 1115 may communicate bi-directionally, via the one or more antennas 1125, wired, or wireless links as described herein. For example, the transceiver 1115 may represent a wireless transceiver and may communicate bi-directionally with another wireless transceiver. The transceiver 1115 may also include a modem to modulate the packets, to provide the modulated packets to one or more antennas 1125 for transmission, and to demodulate packets received from the one or more antennas 1125. The transceiver 1115, or the transceiver 1115 and one or more antennas 1125, may be an example of a transmitter 815, a transmitter 915, a receiver 810, a receiver 910, or any combination thereof or component thereof, as described herein.

The memory 1130 may include RAM and ROM. The memory 1130 may store computer-readable, computer-executable code 1135 including instructions that, when executed by the processor 1140, cause the device 1105 to perform various functions described herein. The code 1135 may be stored in a non-transitory computer-readable medium such as system memory or another type of memory. In some cases, the code 1135 may not be directly executable by the processor 1140 but may cause a computer (e.g., when compiled and executed) to perform functions described herein. In some cases, the memory 1130 may contain, among other things, a BIOS which may control basic hardware or software operation such as the interaction with peripheral components or devices.

The processor 1140 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1140 may be configured to operate a memory array using a memory controller. In some other cases, a memory controller may be integrated into the processor 1140. The processor 1140 may be configured to execute computer-readable instructions stored in a memory (e.g., the memory 1130) to cause the device 1105 to perform various functions (e.g., functions or tasks supporting decoupled uplink and downlink communications via reconfigurable intelligent surfaces). For example, the device 1105 or a component of the device 1105 may include a processor 1140 and memory 1130 coupled to the processor 1140, the processor 1140 and memory 1130 configured to perform various functions described herein.

The inter-station communications manager 1145 may manage communications with other base stations 105, and may include a controller or scheduler for controlling communications with UEs 115 in cooperation with other base stations 105. For example, the inter-station communications manager 1145 may coordinate scheduling for transmissions to UEs 115 for various interference mitigation techniques such as beamforming or joint transmission. In some examples, the inter-station communications manager 1145 may provide an X2 interface within an LTE/LTE-A wireless communications network technology to provide communication between base stations 105.

The communications manager 1120 may support wireless communications at a base station in accordance with examples as disclosed herein. For example, the communications manager 1120 may be configured as or otherwise support a means for transmitting, to a UE, an indication of a first transmission configuration indicator state for downlink communications and a second transmission configuration indicator state for uplink communications. The communications manager 1120 may be configured as or otherwise support a means for transmitting, to the UE via a first passive device according to the first transmission configuration indicator state, a downlink message in a radio frame. The communications manager 1120 may be configured as or otherwise support a means for receiving, from the UE via a second passive device according to the second transmission configuration indicator state, an uplink message in the radio frame.

By including or configuring the communications manager 1120 in accordance with examples as described herein, the device 1105 may support techniques for using different TCI states for uplink and downlink communications. These techniques may support more efficient utilization of communication resources by increasing the gain for uplink and downlink communications via different passive devices, thus resulting in improved communication reliability, improved processing capability, and improved device coordination, among other benefits In some examples, the communications manager 1120 may be configured to perform various operations (e.g., receiving, monitoring, transmitting) using or otherwise in cooperation with the transceiver 1115, the one or more antennas 1125, or any combination thereof. Although the communications manager 1120 is illustrated as a separate component, in some examples, one or more functions described with reference to the communications manager 1120 may be supported by or performed by the processor 1140, the memory 1130, the code 1135, or any combination thereof. For example, the code 1135 may include instructions executable by the processor 1140 to cause the device 1105 to perform various aspects of decoupled uplink and downlink communications via reconfigurable intelligent surfaces as described herein, or the processor 1140 and the memory 1130 may be otherwise configured to perform or support such operations.

FIG. 12 shows a flowchart illustrating a method 1200 that supports decoupled uplink and downlink communications via reconfigurable intelligent surfaces in accordance with aspects of the present disclosure. The operations of the method 1200 may be implemented by a UE or its components as described herein. For example, the operations of the method 1200 may be performed by a UE 115 as described with reference to FIGS. 1 through 7. In some examples, a UE may execute a set of instructions to control the functional elements of the UE to perform the described functions. Additionally or alternatively, the UE may perform aspects of the described functions using special-purpose hardware.

At 1205, the method may include receiving, from a base station, an indication of a first transmission configuration indicator state for downlink communications with the base station and a second transmission configuration indicator state for uplink communications with the base station. The operations of 1205 may be performed in accordance with examples as disclosed herein. In some examples, aspects of the operations of 1205 may be performed by a TCI state interface 625 as described with reference to FIG. 6.

At 1210, the method may include receiving, from the base station via a first passive device associated with the first transmission configuration indicator state, a downlink message in a radio frame. The operations of 1210 may be performed in accordance with examples as disclosed herein. In some examples, aspects of the operations of 1210 may be performed by a downlink communication interface 630 as described with reference to FIG. 6.

At 1215, the method may include transmitting, to the base station via a second passive device associated with the second transmission configuration indicator state, an uplink message in the radio frame. The operations of 1215 may be performed in accordance with examples as disclosed herein. In some examples, aspects of the operations of 1215 may be performed by an uplink communication interface 635 as described with reference to FIG. 6.

FIG. 13 shows a flowchart illustrating a method 1300 that supports decoupled uplink and downlink communications via reconfigurable intelligent surfaces in accordance with aspects of the present disclosure. The operations of the method 1300 may be implemented by a UE or its components as described herein. For example, the operations of the method 1300 may be performed by a UE 115 as described with reference to FIGS. 1 through 7. In some examples, a UE may execute a set of instructions to control the functional elements of the UE to perform the described functions. Additionally or alternatively, the UE may perform aspects of the described functions using special-purpose hardware.

At 1305, the method may include receiving, from a base station, an indication of a first transmission configuration indicator state for downlink communications with the base station and a second transmission configuration indicator state for uplink communications with the base station. The operations of 1305 may be performed in accordance with examples as disclosed herein. In some examples, aspects of the operations of 1305 may be performed by a TCI state interface 625 as described with reference to FIG. 6.

At 1310, the method may include receiving, from the base station and via the first passive device, a source reference signal that is associated with the first passive device. The operations of 1310 may be performed in accordance with examples as disclosed herein. In some examples, aspects of the operations of 1310 may be performed by a reference signal interface 640 as described with reference to FIG. 6.

At 1315, the method may include receiving, from the base station and via the second passive device, a source reference signal that is associated with the second passive device. The operations of 1315 may be performed in accordance with examples as disclosed herein. In some examples, aspects of the operations of 1315 may be performed by a reference signal interface 640 as described with reference to FIG. 6.

At 1320, the method may include receiving, from the base station via a first passive device associated with the first transmission configuration indicator state, a downlink message in a radio frame. The operations of 1320 may be performed in accordance with examples as disclosed herein. In some examples, aspects of the operations of 1320 may be performed by a downlink communication interface 630 as described with reference to FIG. 6.

At 1325, the method may include receiving the downlink message from the base station via the first passive device according to a quasi co-location relationship identified by the UE based on the received source reference signal and the first transmission configuration indicator state. The operations of 1325 may be performed in accordance with examples as disclosed herein. In some examples, aspects of the operations of 1325 may be performed by a QCL component 645 as described with reference to FIG. 6.

At 1330, the method may include transmitting, to the base station via a second passive device associated with the second transmission configuration indicator state, an uplink message in the radio frame. The operations of 1335 may be performed in accordance with examples as disclosed herein. In some examples, aspects of the operations of 1335 may be performed by an uplink communication interface 635 as described with reference to FIG. 6.

At 1335, the method may include transmitting the downlink message to the base station via the second passive device according to a quasi co-location relationship identified by the UE based on the received source reference signal and the second transmission configuration indicator state. The operations of 1330 may be performed in accordance with examples as disclosed herein. In some examples, aspects of the operations of 1330 may be performed by a QCL component 645 as described with reference to FIG. 6.

FIG. 14 shows a flowchart illustrating a method 1400 that supports decoupled uplink and downlink communications via reconfigurable intelligent surfaces in accordance with aspects of the present disclosure. The operations of the method 1400 may be implemented by a UE or its components as described herein. For example, the operations of the method 1400 may be performed by a UE 115 as described with reference to FIGS. 1 through 7. In some examples, a UE may execute a set of instructions to control the functional elements of the UE to perform the described functions. Additionally or alternatively, the UE may perform aspects of the described functions using special-purpose hardware.

At 1405, the method may include receiving, from a base station, an indication of a first transmission configuration indicator state for downlink communications with the base station and a second transmission configuration indicator state for uplink communications with the base station. The operations of 1405 may be performed in accordance with examples as disclosed herein. In some examples, aspects of the operations of 1405 may be performed by a TCI state interface 625 as described with reference to FIG. 6.

At 1410, the method may include receiving, from the base station via a first passive device associated with the first transmission configuration indicator state, a downlink message in a radio frame. The operations of 1410 may be performed in accordance with examples as disclosed herein. In some examples, aspects of the operations of 1410 may be performed by a downlink communication interface 630 as described with reference to FIG. 6.

At 1415, the method may include transmitting, to the base station via a second passive device associated with the second transmission configuration indicator state, an uplink message in the radio frame. The operations of 1415 may be performed in accordance with examples as disclosed herein. In some examples, aspects of the operations of 1415 may be performed by an uplink communication interface 635 as described with reference to FIG. 6.

At 1420, the method may include receiving, from the base station, an indication that the UE is to switch to using the first transmission configuration indicator state for transmitting a second uplink message and using the second transmission configuration indicator state for receiving a second downlink message. The operations of 1420 may be performed in accordance with examples as disclosed herein. In some examples, aspects of the operations of 1420 may be performed by a control message interface 650 as described with reference to FIG. 6.

At 1425, the method may include receiving, based on receiving the indication that the UE is to switch, the second downlink message from the base station in a second radio frame via the second passive device according to the second transmission configuration indicator state. The operations of 1425 may be performed in accordance with examples as disclosed herein. In some examples, aspects of the operations of 1425 may be performed by a downlink communication interface 630 as described with reference to FIG. 6.

At 1430, the method may include transmitting, based on receiving the indication that the UE is to switch, the second uplink message to the base station in the second radio frame via the first passive device according to the first transmission configuration indicator state. The operations of 1430 may be performed in accordance with examples as disclosed herein. In some examples, aspects of the operations of 1430 may be performed by an uplink communication interface 635 as described with reference to FIG. 6.

FIG. 15 shows a flowchart illustrating a method 1500 that supports decoupled uplink and downlink communications via reconfigurable intelligent surfaces in accordance with aspects of the present disclosure. The operations of the method 1500 may be implemented by a base station or its components as described herein. For example, the operations of the method 1500 may be performed by a base station 105 as described with reference to FIGS. 1 through 3 and 8 through 11. In some examples, a base station may execute a set of instructions to control the functional elements of the base station to perform the described functions. Additionally or alternatively, the base station may perform aspects of the described functions using special-purpose hardware.

At 1505, the method may include transmitting, to a UE, an indication of a first transmission configuration indicator state for downlink communications with the base station and a second transmission configuration indicator state for uplink communications with the base station. The operations of 1505 may be performed in accordance with examples as disclosed herein. In some examples, aspects of the operations of 1505 may be performed by a TCI state interface 1025 as described with reference to FIG. 10.

At 1510, the method may include transmitting, to the UE via a first passive device according to the first transmission configuration indicator state, a downlink message in a radio frame. The operations of 1510 may be performed in accordance with examples as disclosed herein. In some examples, aspects of the operations of 1510 may be performed by a downlink communication interface 1030 as described with reference to FIG. 10.

At 1515, the method may include receiving, from the UE via a second passive device according to the second transmission configuration indicator state, an uplink message in the radio frame. The operations of 1515 may be performed in accordance with examples as disclosed herein. In some examples, aspects of the operations of 1515 may be performed by an uplink communication interface 1035 as described with reference to FIG. 10.

The following provides an overview of aspects of the present disclosure:

Aspect 1: A method for wireless communications at a UE, comprising: receiving, from a base station, an indication of a first transmission configuration indicator state for downlink communications with the base station and a second transmission configuration indicator state for uplink communications with the base station; receiving, from the base station via a first passive device associated with the first transmission configuration indicator state, a downlink message in a radio frame;

and transmitting, to the base station via a second passive device associated with the second transmission configuration indicator state, an uplink message in the radio frame.

Aspect 2: The method of aspect 1, further comprising: receiving, from the base station and via the first passive device, a source reference signal that is associated with the first passive device; and receiving the downlink message from the base station via the first passive device according to a quasi co-location relationship identified by the UE based at least in part on the received source reference signal and the first transmission configuration indicator state.

Aspect 3: The method of any of aspects 1 through 2, further comprising: receiving, from the base station and via the second passive device, a source reference signal that is associated with the second passive device; and transmitting the downlink message to the base station via the second passive device according to a quasi co-location relationship identified by the UE based at least in part on the received source reference signal and the second transmission configuration indicator state.

Aspect 4: The method of any of aspects 1 through 3, further comprising: receiving, from the base station, an indication that the UE is to switch to using the first transmission configuration indicator state for transmitting a second uplink message and using the second transmission configuration indicator state for receiving a second downlink message; receiving, based at least in part on receiving the indication that the UE is to switch, the second downlink message from the base station in a second radio frame via the second passive device according to the second transmission configuration indicator state; and transmitting, based at least in part on receiving the indication that the UE is to switch, the second uplink message to the base station in the second radio frame via the first passive device according to the first transmission configuration indicator state.

Aspect 5: The method of aspect 4, wherein receiving the indication that the UE is to switch comprises: receiving a downlink control information message or a medium access control layer control element message comprising the indication that the UE is to switch.

Aspect 6: The method of any of aspects 4 through 5, wherein receiving the indication that the UE is to switch comprises: receiving an indication of a first source reference signal corresponding to the first transmission configuration indicator state and an indication of a second source reference signal corresponding to the second transmission configuration indicator state.

Aspect 7: The method of any of aspects 1 through 6, wherein the first passive device is a first reconfigurable intelligent surface and the second passive device is a second reconfigurable intelligent surface.

Aspect 8: The method of any of aspects 1 through 7, further comprising: generating feedback associated with receipt of the downlink message according to the first transmission configuration indicator state; and transmitting the feedback in the uplink message according to the second transmission configuration indicator state.

Aspect 9: The method of any of aspects 1 through 8, further comprising: receiving, in the downlink message, feedback associated with transmission of the uplink message according to the second transmission configuration indicator state.

Aspect 10: A method for wireless communications at a base station, comprising: transmitting, to a UE, an indication of a first transmission configuration indicator state for downlink communications and a second transmission configuration indicator state for uplink communications; transmitting, to the UE via a first passive device according to the first transmission configuration indicator state, a downlink message in a radio frame; and receiving, from the UE via a second passive device according to the second transmission configuration indicator state, an uplink message in the radio frame.

Aspect 11: The method of aspect 10, further comprising: transmitting, to the UE via the first passive device, a source reference signal that is associated with the first passive device; and transmitting, to the UE via the first passive device, the downlink message based at least in part on a quasi co-location relationship associated with the transmitted source reference signal and defined by the first transmission configuration indicator state.

Aspect 12: The method of any of aspects 10 through 11, further comprising: transmitting, to the UE via the second passive device, a source reference signal that is associated with the second passive device; and receiving, from the UE via the second passive device, the uplink message based at least in part on a quasi co-location relationship associated with the transmitted source reference signal and defined by the second transmission configuration indicator state.

Aspect 13: The method of any of aspects 10 through 12, further comprising: transmitting, to the UE, an indication that the UE is to switch to using the first transmission configuration indicator state for transmitting a second uplink message and the second transmission configuration indicator state for receiving a second downlink message; transmitting, based at least in part on transmitting the indication that the UE is to switch, the second downlink message in a second radio frame via the second passive device according to the second transmission configuration indicator state; and receiving, based at least in part on transmitting the indication that the UE is to switch, the second uplink message in the second radio frame via the first passive device according to the first transmission configuration indicator state.

Aspect 14: The method of aspect 13, wherein transmitting the indication that the UE is to switch comprises: transmitting a downlink control information message or a medium access control layer control element message comprising the indication that the UE is to switch.

Aspect 15: The method of any of aspects 13 through 14, wherein transmitting the indication that the UE is to switch comprises: transmitting an indication of a first source reference signal corresponding to the first transmission configuration indicator state and an indication of a second source reference signal corresponding to the second transmission configuration indicator state.

Aspect 16: The method of any of aspects 10 through 15, wherein the first passive device is a first reconfigurable intelligent surface and the second passive device is a second reconfigurable intelligent surface.

Aspect 17: The method of any of aspects 10 through 16, wherein receiving the uplink message comprises: receiving, from the UE, feedback associated with the transmitted downlink message.

Aspect 18: The method of any of aspects 10 through 17, further comprising: generating feedback associated with receipt of the uplink message that is transmitted by the UE via the second transmission configuration indicator state; and transmitting the feedback in the downlink message via the first transmission configuration indicator state.

Aspect 19: An apparatus for wireless communications at a UE, comprising a processor; memory coupled with the processor; and instructions stored in the memory and executable by the processor to cause the apparatus to perform a method of any of aspects 1 through 9.

Aspect 20: An apparatus for wireless communications at a UE, comprising at least one means for performing a method of any of aspects 1 through 9.

Aspect 21: A non-transitory computer-readable medium storing code for wireless communications at a UE, the code comprising instructions executable by a processor to perform a method of any of aspects 1 through 9.

Aspect 22: An apparatus for wireless communications at a base station, comprising a processor; memory coupled with the processor; and instructions stored in the memory and executable by the processor to cause the apparatus to perform a method of any of aspects 10 through 18.

Aspect 23: An apparatus for wireless communications at a base station, comprising at least one means for performing a method of any of aspects 10 through 18.

Aspect 24: A non-transitory computer-readable medium storing code for wireless communications at a base station, the code comprising instructions executable by a processor to perform a method of any of aspects 10 through 18.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

The term "determine" or "determining" encompasses a wide variety of actions and, therefore, "determining" can include calculating, computing, processing, deriving, investigating, looking up (such as via looking up in a table, a database or another data structure), ascertaining and the like. Also, "determining" can include receiving (such as receiving information), accessing (such as accessing data in a memory) and the like. Also, "determining" can include resolving, selecting, choosing, establishing and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A method for wireless communications at a user equipment (UE), comprising:
  receiving, from a base station, an indication of a first transmission configuration indicator state for downlink communications with the base station and a second transmission configuration indicator state for uplink communications with the base station, wherein the indication configures uplink communications to be routed from the UE to the base station via a first passive device that is different than a second passive device used to route downlink communications from the base station to the UE;
  receiving, from the base station via the first passive device associated with the first transmission configuration indicator state, a downlink message in a radio frame; and
  transmitting, to the base station via the second passive device associated with the second transmission configuration indicator state, an uplink message in the radio frame.

2. The method of claim 1, further comprising:
  receiving, from the base station and via the first passive device, a source reference signal that is associated with the first passive device; and
  receiving the downlink message from the base station via the first passive device according to a quasi co-location relationship identified by the UE based at least in part on the received source reference signal and the first transmission configuration indicator state.

3. The method of claim 1, further comprising:
  receiving, from the base station and via the second passive device, a source reference signal that is associated with the second passive device; and
  transmitting the uplink message to the base station via the second passive device according to a quasi co-location relationship identified by the UE based at least in part on the received source reference signal and the second transmission configuration indicator state.

4. The method of claim 1, further comprising:
  receiving, from the base station, an indication that the UE is to switch to using the first transmission configuration indicator state for transmitting a second uplink message and using the second transmission configuration indicator state for receiving a second downlink message;
  receiving, based at least in part on receiving the indication that the UE is to switch, the second downlink message from the base station in a second radio frame via the second passive device according to the second transmission configuration indicator state; and
  transmitting, based at least in part on receiving the indication that the UE is to switch, the second uplink message to the base station in the second radio frame via the first passive device according to the first transmission configuration indicator state.

5. The method of claim 4, wherein receiving the indication that the UE is to switch comprises:
  receiving a downlink control information message or a medium access control layer control element message comprising the indication that the UE is to switch.

6. The method of claim 4, wherein receiving the indication that the UE is to switch comprises:
  receiving an indication of a first source reference signal corresponding to the first transmission configuration indicator state and an indication of a second source reference signal corresponding to the second transmission configuration indicator state.

7. The method of claim 1, wherein the first passive device is a first reconfigurable intelligent surface and the second passive device is a second reconfigurable intelligent surface.

8. The method of claim 1, further comprising:
  generating feedback associated with receipt of the downlink message according to the first transmission configuration indicator state; and
  transmitting the feedback in the uplink message according to the second transmission configuration indicator state.

9. The method of claim 1, further comprising:
  receiving, in the downlink message, feedback associated with transmission of the uplink message according to the second transmission configuration indicator state.

10. A method for wireless communications at a base station, comprising:
  transmitting, to a user equipment (UE), an indication of a first transmission configuration indicator state for downlink communications and a second transmission configuration indicator state for uplink communications, wherein the indication configures uplink communications to be routed from the UE to the base station via a first passive device that is different than a second passive device used to route downlink communications from the base station to the UE;
  transmitting, to the UE via the first passive device according to the first transmission configuration indicator state, a downlink message in a radio frame; and
  receiving, from the UE via the second passive device according to the second transmission configuration indicator state, an uplink message in the radio frame.

11. The method of claim 10, further comprising:
transmitting, to the UE via the first passive device, a source reference signal that is associated with the first passive device; and
transmitting, to the UE via the first passive device, the downlink message based at least in part on a quasi co-location relationship associated with the transmitted source reference signal and defined by the first transmission configuration indicator state.

12. The method of claim 10, further comprising:
transmitting, to the UE via the second passive device, a source reference signal that is associated with the second passive device; and
receiving, from the UE via the second passive device, the uplink message based at least in part on a quasi co-location relationship associated with the transmitted source reference signal and defined by the second transmission configuration indicator state.

13. The method of claim 10, further comprising:
transmitting, to the UE, an indication that the UE is to switch to using the first transmission configuration indicator state for transmitting a second uplink message and the second transmission configuration indicator state for receiving a second downlink message;
transmitting, based at least in part on transmitting the indication that the UE is to switch, the second downlink message in a second radio frame via the second passive device according to the second transmission configuration indicator state; and
receiving, based at least in part on transmitting the indication that the UE is to switch, the second uplink message in the second radio frame via the first passive device according to the first transmission configuration indicator state.

14. The method of claim 13, wherein transmitting the indication that the UE is to switch comprises:
transmitting a downlink control information message or a medium access control layer control element message comprising the indication that the UE is to switch.

15. The method of claim 13, wherein transmitting the indication that the UE is to switch comprises:
transmitting an indication of a first source reference signal corresponding to the first transmission configuration indicator state and an indication of a second source reference signal corresponding to the second transmission configuration indicator state.

16. The method of claim 10, wherein the first passive device is a first reconfigurable intelligent surface and the second passive device is a second reconfigurable intelligent surface.

17. The method of claim 10, wherein receiving the uplink message comprises:
receiving, from the UE, feedback associated with the transmitted downlink message.

18. The method of claim 10, further comprising:
generating feedback associated with receipt of the uplink message that is transmitted by the UE via the second transmission configuration indicator state; and
transmitting the feedback in the downlink message via the first transmission configuration indicator state.

19. An apparatus for wireless communications at a user equipment (UE), comprising:
a processor;
memory coupled with the processor; and
instructions stored in the memory and executable by the processor to cause the apparatus to:

46 receive, from a base station, an indication of a first transmission configuration indicator state for downlink communications with the base station and a second transmission configuration indicator state for uplink communications with the base station, wherein the indication configures uplink communications to be routed from the UE to the base station via a first passive device that is different than a second passive device used to route downlink communications from the base station to the UE;
receive, from the base station via the first passive device associated with the first transmission configuration indicator state, a downlink message in a radio frame; and
transmit, to the base station via the second passive device associated with the second transmission configuration indicator state, an uplink message in the radio frame.

20. The apparatus of claim 19, wherein the instructions are further executable by the processor to cause the apparatus to:
receive, from the base station and via the first passive device, a source reference signal that is associated with the first passive device; and
receive the downlink message from the base station via the first passive device according to a quasi co-location relationship identified by the UE based at least in part on the received source reference signal and the first transmission configuration indicator state.

21. The apparatus of claim 19, wherein the instructions are further executable by the processor to cause the apparatus to:
receive, from the base station and via the second passive device, a source reference signal that is associated with the second passive device; and
transmit the uplink message to the base station via the second passive device according to a quasi co-location relationship identified by the UE based at least in part on the received source reference signal and the second transmission configuration indicator state.

22. The apparatus of claim 19, wherein the instructions are further executable by the processor to cause the apparatus to:
receive, from the base station, an indication that the UE is to switch to using the first transmission configuration indicator state for transmitting a second uplink message and using the second transmission configuration indicator state for receiving a second downlink message;
receive, based at least in part on receiving the indication that the UE is to switch, the second downlink message from the base station in a second radio frame via the second passive device according to the second transmission configuration indicator state; and
transmit, based at least in part on receiving the indication that the UE is to switch, the second uplink message to the base station in the second radio frame via the first passive device according to the first transmission configuration indicator state.

23. The apparatus of claim 22, wherein the instructions are further executable by the processor to receive the indication that the UE is to switch by being executable by the processor to:
receive a downlink control information message or a medium access control layer control element message comprising the indication that the UE is to switch.

24. The apparatus of claim 22, wherein the instructions are further executable by the processor to receive the indication that the UE is to switch by being executable by the processor to:

receive an indication of a first source reference signal corresponding to the first transmission configuration indicator state and an indication of a second source reference signal corresponding to the second transmission configuration indicator state.

25. The apparatus of claim 19, wherein the first passive device is a first reconfigurable intelligent surface and the second passive device is a second reconfigurable intelligent surface.

26. The apparatus of claim 19, wherein the instructions are further executable by the processor to cause the apparatus to:

generate feedback associated with receipt of the downlink message according to the first transmission configuration indicator state; and transmit the feedback in the uplink message according to the second transmission configuration indicator state.

27. The apparatus of claim 19, wherein the instructions are further executable by the processor to cause the apparatus to:

receive, in the downlink message, feedback associated with transmission of the uplink message according to the second transmission configuration indicator state.

28. An apparatus for wireless communications at a base station, comprising:

a processor;

memory coupled with the processor; and instructions stored in the memory and executable by the processor to cause the apparatus to:

transmit, to a user equipment (UE), an indication of a first transmission configuration indicator state for downlink communications and a second transmission configuration indicator state for uplink communications, wherein the indication configures uplink communications to be routed from the UE to the base station via a first passive device that is different than a second passive device used to route downlink communications from the base station to the UE;

transmit, to the UE via the first passive device according to the first transmission configuration indicator state, a downlink message in a radio frame; and receive, from the UE via the second passive device according to the second transmission configuration indicator state, an uplink message in the radio frame.

29. The apparatus of claim 28, wherein the instructions are further executable by the processor to cause the apparatus to:

transmit, to the UE via the first passive device, a source reference signal that is associated with the first passive device; and transmit, to the UE via the first passive device, the downlink message based at least in part on a quasi co-location relationship associated with the transmitted source reference signal and defined by the first transmission configuration indicator state.

30. The apparatus of claim 28, wherein the instructions are further executable by the processor to cause the apparatus to:

transmit, to the UE via the second passive device, a source reference signal that is associated with the second passive device; and receive, from the UE via the second passive device, the uplink message based at least in part on a quasi co-location relationship associated with the transmitted source reference signal and defined by the second transmission configuration indicator state.

* * * * *